(12) United States Patent
D'Auria

(10) Patent No.: US 12,020,279 B2
(45) Date of Patent: Jun. 25, 2024

(54) SYSTEM AND METHODS TO PREDICT WINNING TV ADS, ONLINE VIDEOS, AND OTHER AUDIOVISUAL CONTENT BEFORE PRODUCTION

(71) Applicant: Timothy Christopher D'Auria, Sharon, MA (US)

(72) Inventor: Timothy Christopher D'Auria, Sharon, MA (US)

(73) Assignee: REFERCLOUD LLC, Sharon, MA (US)

( * ) Notice: Subject to any disclaimer, the term of this patent is extended or adjusted under 35 U.S.C. 154(b) by 0 days.

(21) Appl. No.: 17/727,088

(22) Filed: Apr. 22, 2022

(65) Prior Publication Data
US 2022/0351236 A1    Nov. 3, 2022

Related U.S. Application Data

(60) Provisional application No. 63/183,098, filed on May 3, 2021.

(51) Int. Cl.
*G06Q 30/0242* (2023.01)
*H04N 21/234* (2011.01)
*H04N 21/81* (2011.01)

(52) U.S. Cl.
CPC ... *G06Q 30/0242* (2013.01); *H04N 21/23418* (2013.01); *H04N 21/812* (2013.01)

(58) Field of Classification Search
CPC ......... G06Q 30/0242; H04N 21/23418; H04N 21/812
USPC ...................................... 705/14.41
See application file for complete search history.

(56) References Cited

U.S. PATENT DOCUMENTS

| | | | |
|---|---|---|---|
| 2008/0088635 A1* | 4/2008 | Callway | H04N 5/14 348/E5.062 |
| 2014/0040019 A1* | 2/2014 | Zheng | G06Q 30/0251 705/14.45 |
| 2018/0032636 A1* | 2/2018 | Mullaney | G06N 5/022 |
| 2018/0096397 A1* | 4/2018 | Goeldi | G06Q 30/0271 |
| 2019/0087870 A1* | 3/2019 | Gardyne | H04N 21/2743 |

(Continued)

OTHER PUBLICATIONS

Amalia Madaline pop, The Best Examples of Creative Ads Using Visual Metaphors, 2020 (Year: 2020).*

*Primary Examiner* — Tarek Elchanti
(74) *Attorney, Agent, or Firm* — Michael J. Feigin, Esq.; Feigin and Fridman LLC

(57) ABSTRACT

The invention discloses a system and methods for predicting attributes of effective television ads, digital video, and other audiovisual content before production. Output comprises instructions for producing videos optimized to achieve at least one performance objective. Some embodiments predict performance of existing video, such as predicting winning Super Bowl ads before they air. The system comprises one or more processors and a memory configured to receive at least one data stream of audiovisual content in at least one public and/or a private domain; analyze said data streams to determine one or more attributes associated with said data streams; analyze said data streams to determine one or more performance scores associated with said data streams; attribute at least a portion of one said performance score to at least a portion of one said attribute associated with said data streams, and output, to a memory, any or all combinations thereof.

17 Claims, 24 Drawing Sheets

EXAMPLE OF ATTRIBUTE RECOGNITION 108 USING VISUAL DATA PROCESSOR 202

(56) References Cited

U.S. PATENT DOCUMENTS

| | | | |
|---|---|---|---|
| 2019/0114680 A1* | 4/2019 | Chien | G06N 20/00 |
| 2019/0172494 A1* | 6/2019 | Kolarov | G06V 20/41 |
| 2020/0021873 A1* | 1/2020 | Swaminathan | H04N 21/466 |
| 2020/0320571 A1* | 10/2020 | Singh | G06N 20/00 |
| 2021/0287379 A1* | 9/2021 | Zheng | G06T 13/80 |

* cited by examiner

PATTERN RECOGNITION 114 EXAMPLE

| Video ID | # of Actors | Actors' Accent | Revenue Lift on Male Audience | Revenue Lift on Female Audience | Search Lift on Male Audience | Search Lift on Female Audience |
|---|---|---|---|---|---|---|
| 1 | 1 | British | 4 | 2 | 10 | 6 |
| 2 | 1 | French | 0 | 5 | 5 | 10 |
| 3 | 2 | British | 10 | 2 | 2 | 8 |
| 4 | 2 | French | 0 | 8 | 8 | 4 |

Model Fitting 808

Recognized Pattern Examples 810

810a To Maximize Revenue on Male Audience: Create video having 2 actors with British accents.

810b To Maximize Search Lift on Female Audience: Create video having 1 actor with a French accent.

FIG. 8.

WEB PORTAL 118
(INPUT VIEW)

SELECT TARGET METRICS(S)
- website traffic
- website revenue
- search lift
- return on ad spend (ROAS)
- foot traffic
- shopping cart adds
- checkout starts

SELECT TARGET AUDIENCE(S)
- males
- females
- people between ages 21 - 35
- US residents
- people with cooking interest
- US females between ages 21 - 25

SELECT PERIOD OF TIME TO MEASURE
- 5 minutes following video ad
- 1 minute following video ad
- 45 seconds following video ad
- 30 days following video ad

SELECT TARGET CHANNEL(S)
- US Broadcast Television
- US Cable Television
- Digital Video Platform A
- Digital Video Platform B

[submit]

FIG. 10.

WEB PORTAL 118
(OUTPUT VIEW A)

WEB PORTAL 118
(OUTPUT VIEW B)

WEB PORTAL 118
(OUTPUT VIEW C)

VideoQuant Output Blueprint

Below is a recommended tv ad blueprint to maximize car rentals for your auto rental company in Dallas, TX for the age 21 - 35 demographic.

- Topic: life is short, drive more for fun
- Actors: 1 male hispanic adult age 20 - 35, 1 female hispanic adult age 20 - 35, 2 children
- Recommended Plot Line:
    - mom and dad busy working, no time for kids
    - parents tired of the daily grind
    - mom and dad talk, decide to have more fun
    - buy a red sports car
    - kids and family jumping into car while smiling
    - drive cross country to Disney World, Yosemite
- Recommended voice over message:
    - Life is short. It's time to drive.
- Recommended media to run ad on:
    - Noggin network, 7AM - 9AM
    - CNN network, 7PM - 9PM
- Recommended ad duration: 30 seconds
- Recommended channel: US Broadcast TV

FIG. 13.

DEINDEXING SEARCH QUERY TRENDS FOR TV & VIDEO ATTRIBUTION

1500   Keyword: "Company XYZ"

1502

| Jan 1 | Jan 2 | Jan 3 | Jan 4 | Jan 5 | ... | Dec 31 |
|---|---|---|---|---|---|---|
| 10 (0.8%) | 7 (0.6%) | 0 (0.0%) | 18 (1.5%) | 54 (0.4%) | ... | 100 (8.2%) |

1502a

1504

| 12 AM | 1 AM | 2 AM | 3 AM | 4 AM | 5 AM | 6 AM | 7 AM | 8 AM | 9 AM | 10 AM | 11 AM | 12 PM | 1 PM | 2 PM | 3 PM | 4 PM | 5 PM | 6 PM | 7 PM | 8 PM | 9 PM | 10 PM | 11 PM |
|---|---|---|---|---|---|---|---|---|---|---|---|---|---|---|---|---|---|---|---|---|---|---|---|
| 0 | 18 | 23 | 36 | 64 | 34 | 42 | 56 | 34 | 75 | 100 | 42 | 57 | 98 | 87 | 76 | 87 | 86 | 65 | 54 | 76 | 65 | 55 | 10 |

1506

| 12 AM | 1 AM | 2 AM | 3 AM | 4 AM | 5 AM | 6 AM | 7 AM | 8 AM | 9 AM | 10 AM | 11 AM | 12 PM | 1 PM | 2 PM | 3 PM | 4 PM | 5 PM | 6 PM | 7 PM | 8 PM | 9 PM | 10 PM | 11 PM |
|---|---|---|---|---|---|---|---|---|---|---|---|---|---|---|---|---|---|---|---|---|---|---|---|
| 0.0% | 1.3% | 1.7% | 2.7% | 4.8% | 2.5% | 3.1% | 4.2% | 2.5% | 5.6% | 7.5% | 3.1% | 4.3% | 7.3% | 6.5% | 5.7% | 6.5% | 6.4% | 4.9% | 4.0% | 5.7% | 4.9% | 4.1% | 0.7% |

1508

| 0 | 1 | 2 | 3 | 4 | ... | 59 |
|---|---|---|---|---|---|---|
| 6 | 8 | 1 | 0 | 5 | ... | 8 |

1510

| 0 | 1 | 2 | 3 | 4 | ... | 59 |
|---|---|---|---|---|---|---|
| 9.0% | 11.9% | 1.5% | 0.0% | 7.5% | ... | 11.9% |

1512    Jan 1 (0.8%) × 3:00 AM (2.7%) × Minute 4 (7.5%) = 0.00162%

1514    Jan Queries (100000) / Sum of Jan Minutely Percentages (7.5%) × Minute 4 % (0.00162%) = 21.6

FIG. 15.

METHOD FOR IDENTIFYING VIDEO PERFORMANCE SIGNALS ASSOCIATED WITH VIDEO ATTRIBUTES
FIG. 16.

EXAMPLE OF IDENTIFYING & INFERRING PERFORMANCE SIGNALS FROM COMPETITOR MARKETING TESTS
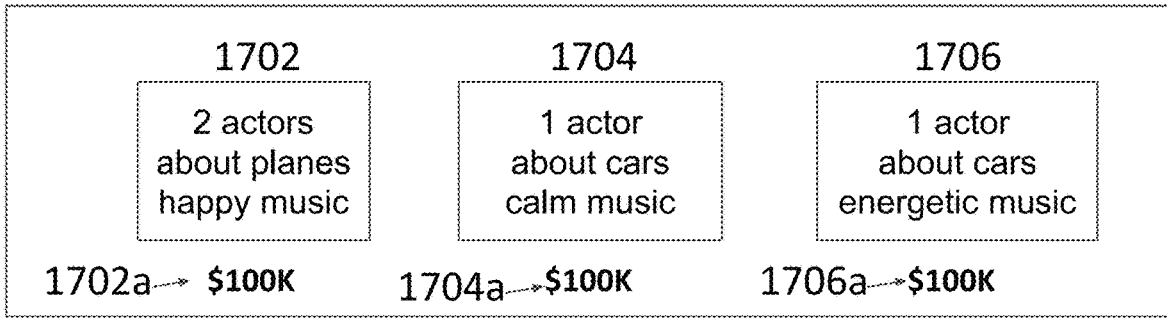
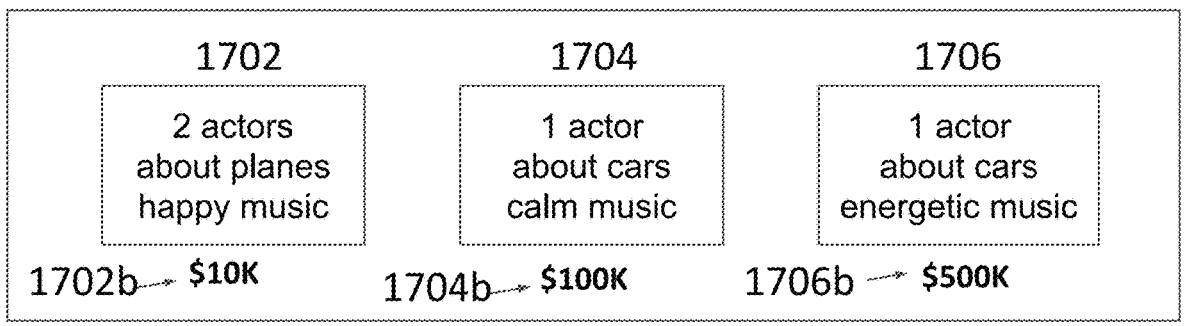
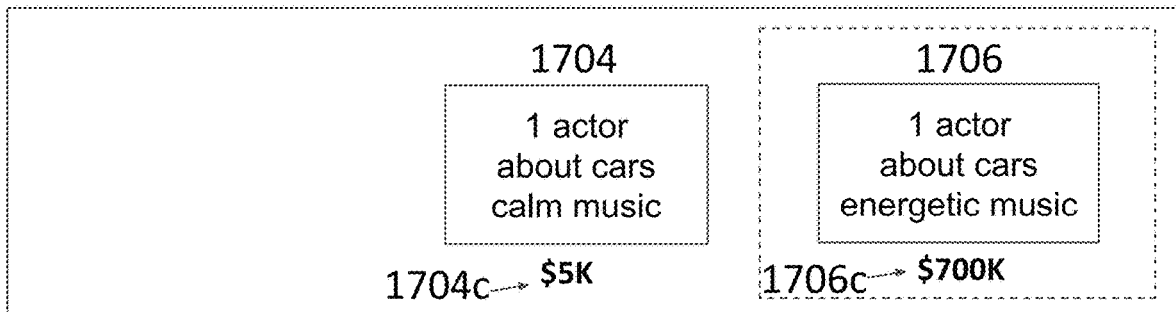
FIG. 17.

IDENTIFYING & INFERRING PERFORMANCE SIGNALS FROM COMPETITOR MARKETING TESTS (EXAMPLE 2)
State 1    1800
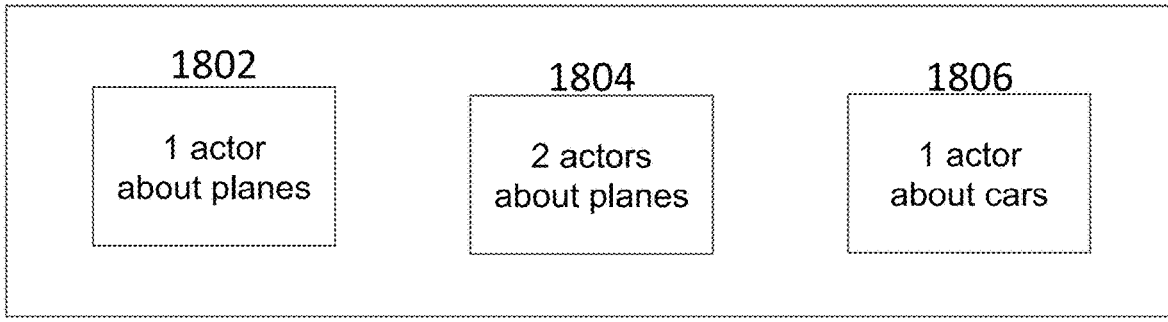
State 2    1808
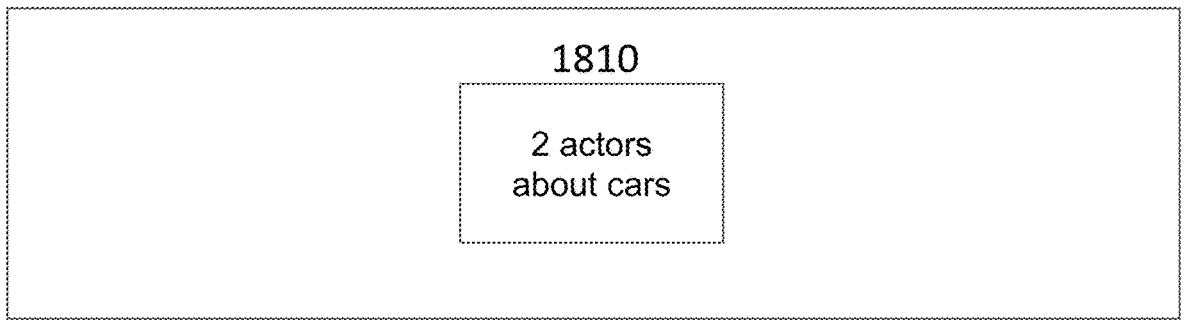
FIG. 18.

EXAMPLE OF USING PROFESSIONAL CV INSIGHTS TO WEIGHT CREDIBILITY OF DETECTED COMPETITOR VIDEO PERFORMANCE SIGNALS
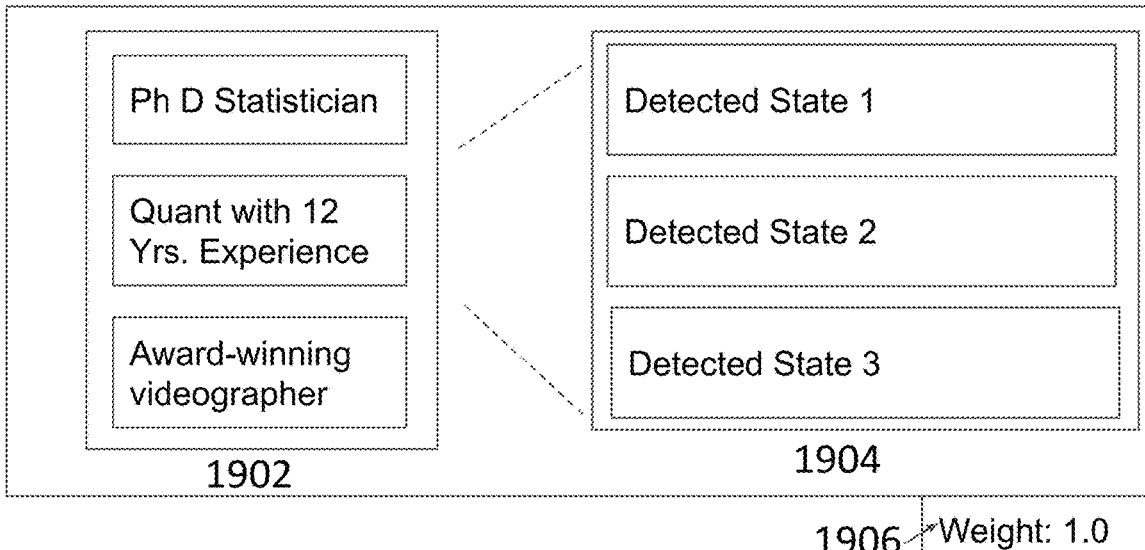
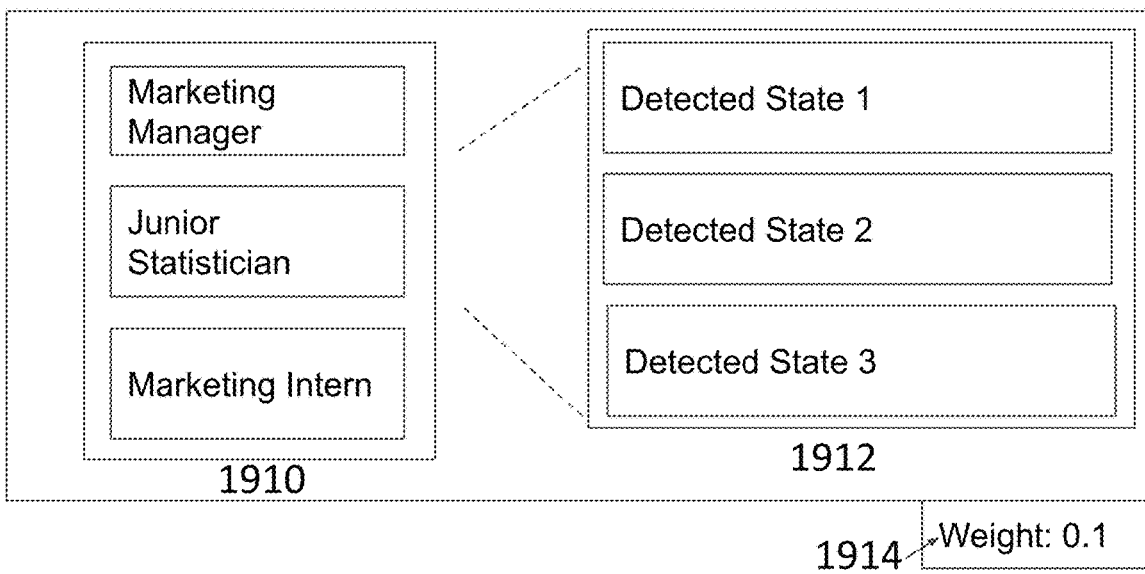
FIG. 19.

EXAMPLE OF PATTERN RECOGNITION 114 ON ATTRIBUTES FROM AUDIO DATA PROCESSOR 204 AND VISUAL DATA PROCESSOR 202 AND LABELS OUTPUT BY EFFECTIVENESS MEASUREMENT 110

EXAMPLE OF TRAINING MODELS FOR AUDIO CLASSIFICATION 416

EXAMPLE OF TRAINING MODELS FOR VISUAL CLASSIFICATION 308

SYSTEM AND METHODS TO PREDICT WINNING TV ADS, ONLINE VIDEOS, AND OTHER AUDIOVISUAL CONTENT BEFORE PRODUCTION

CROSS REFERENCE TO RELATED APPLICATION

This application claims priority to the U.S. Provisional Patent Application No. 63/183,098 filed in the US on 05/02/2021, the disclosure of which is incorporated by reference in its entirety.

FIELD OF THE INVENTION

The present invention relates to novel methods and a system for television and digital video performance optimization. More particularly, the invention relates to a system that, without requiring investment in video production and testing, predicts video concepts and attributes likely to succeed at achieving at least one performance objective.

BACKGROUND OF THE INVENTION

Most paid and organic video marketing investments made by companies today, including television advertisements and online video, are wasted dollars. The industry status quo has advertisers and video content creators using guesswork and trial-and-error to ideate and test each of video concepts and media, but this approach is expensive and inefficient since video costs, unlike other marketing and content mediums, are large and heavily front-loaded.

As it relates to A/B testing and other advertising optimization techniques, the cost-to-learn ratio for video is larger than other content mediums, examples of other content mediums that include but are not limited to search engine marketing (SEM), SEO, direct mail, email, and affiliate marketing. A single video A/B test, sized correctly, can consume entire advertising budgets and not result in meaningful learnings or realized gains.

For example, by the time a brand builds a TV commercial and runs media to test it, the brand has often already incurred most of the costs associated with the marketing. This front-loading of video costs is not unique to TV ads; it is observed across most every video media forum, including streaming, and across both paid and organic online channels.

Most video investments today ultimately fail to achieve one or more objectives that motivated their development in the first place.

Across the global TV and digital video ad markets that are estimated at $278 Billion and $172 Billion per year as of early 2021, respectively, the industry status quo is to make large, upfront financial and time investments in producing and spending media dollars on video content that is the result of expert speculation and guesswork, only to find out after-the-fact that much of that content fails to achieve the intended goal. This results in an estimated $225 Billion in wasted investments each year across the global video market.

As a more intuitive example of the problem, hundreds of millions of dollars are spent on Super Bowl television ads alone each year that ultimately fail. The price of a single 30-second Super Bowl commercial in 2022 was $6,500,000 and each Super Bowl has a total of roughly 40-50 ads per year. Many of these ads are later universally recognized as failures. As one example, the 30-second Blackberry Z10 television ad that ran during the Super Bowl 2012 Super Cup was the product of a ~$3.8 M investment, but ultimately was found to likely have no material impact on the business. This result is typical for the industry as a whole regardless of the size of the video ad; only after major upfront spending on a video do advertisers and content creators often later realize that the investment could not achieve advertising objectives, such as boosting sales, traffic, views, subscriptions, or brand awareness, as expected.

As another example of the problem, on the predominant digital video platform today, it is estimated that over 97% of monetizing organic channels fail to generate meaningful revenue. This suggests that most money and time spent building video content is waste.

Prior Art Weakness and Limitations

Most video advertising is the product of expert opinion and guesswork, making limited or no use of quantitative optimization. The limited prior art that does exist in the domain of audiovisual performance optimization is backwards-looking.

The limited prior art related to quantitative audiovisual performance optimization requires costly upfront investment in ideating, producing, and running video content to assess potential of the content to achieve objectives. Unlike other marketing channels like search engine marketing (SEM), the prior art "test and learn" and/or "trial and error" approach, including such techniques as split (AB) testing, multi-armed bandits, and/or other experimental designs, as applied to video, is highly inefficient at best and financially infeasible at worst due to the high cost of developing and running video content, especially on TV.

It is estimated that TV advertising at a large brand, as compared to SEM advertising, has a 1,840× cost-to-learn ratio. That is, for each $1 invested in testing to learn how to optimize SEM ads, such as identifying the best-performing messaging and audiences, TV ads require $1,840 to achieve comparable insights that may then be used to improve video content going forward. Video's high cost-to-learn ratio makes the status quo test and learn approach grossly inefficient.

In addition to the status quo video optimization technique of controlled experiments being front-loaded with cost, it often is not realistically possible to perform it accurately and/or ethically on common audiovisual mediums of interest to the field. For example, it is common to observe statistical and/or data science marketing practitioners attempt to perform a geo-based test to measure video. Typically, at least two sets of geographical locations are identified, each set assessed to be statistically comparable to one another. At least one audiovisual stimulus is applied to one set while another set does not receive the stimulus. The exposed and unexposed sets are then compared at some later point in time, with the measured difference between the two on some performance metric being attributed to the audiovisual stimulus.

As yet another flaw with the limited prior art, such controlled experimental designs for video attribution are almost never valid in practice. First, it is very difficult to create two sets of geographic entities that are statistically balanced over time. In practice, it is common to observe these groupings have their metrics diverge over time, even without an audiovisual stimulus being applied. While some practitioners may attempt to counteract this unbalance by using lower levels of granularity, for example, instead of using Designated Market Areas (DMAs), using zip codes or counties, it is typically not possible to purchase comparable audiovisual media at these lower geographical granularities. If and when media is available at these lower granularities, the media is often materially different from the audiovisual stimulus that was intended to be measured. For example, it might be delivered over a computer vs. over broadcast or cable television, or only select times may be available for airings that do not align with the video media that is the intended target for measurement.

Practitioners may attempt to "boost the signal" to overcome a noisy baseline. That is, buy more audiovisual media to help overcome the observed baseline divergences and noise between the two or more comparable sets in an experimental design scheme. The problem here is that this approach, once again, requires buying media in a way that differs from what the practitioner desires to measure. Furthermore, the costs are typically very high; a single flawed geo-based test can easily cost over $10 M for a large brand with a high baseline of traffic, yet yield limited meaningful insights.

In the field of TV advertising, it is often the case that businesses only have sufficient budget for one base ad creative, with some variations on said base. This further renders the prior art ineffective since marketing budgets can be exhausted by a single test of base creative. By the time prior art renders a verdict on the success of any given base video ad, the business has no budget remaining to implement any "test and learn" findings. For many businesses, there is no other option but to hit a home run on the first attempt when it comes to TV advertising and/or other high-cost video media channels.

Embodiments of the present invention solve each of these problems with the prior art by eliminating the need to build video creative and/or run video media before gaining rich insights into video attributes likely to succeed, thus representing a substantial improvement over the status quo and the limited prior art. Embodiments of the invention enables brands to avoid what is often millions of dollars of backwards-looking video tests and/or video marketing failures, yet achieve materially similar benefits to those achievable if they had spent these dollars.

SUMMARY OF THE INVENTION

The invention described herein is a summary of a system and methods to predict winning video content without necessarily making any upfront investment in producing video content.

The present invention discloses a system for predicting attributes of video advertisements and/or other audiovisual content optimized to achieve one or more performance objectives. The system comprises one or more processors and a memory configured to receive one or more data streams of audiovisual content in one or more public and/or a private domains; analyze the one or more data streams to determine one or more attributes associated with the one or more data streams; compute and attribute one or more performance scores to one or more attributes associated with of the one or more data streams, and output, to a memory, any or all combinations thereof. The output may provide at least one recommendation of a video attribute, an example that includes but is not limited to video topic, based on the one or more data streams and provides a collection of attributes that collectively maximize and/or minimize one or more performance scores. The computation of an aggregation of attributes comprises an optimized performance score. The generating of a new data stream of audiovisual content as a result of the output, wherein one or more data streams comprise competitor data and/or other third-party data. Whereas the analyzing means includes one or more input information attributes that may be received from a human operator, the input information attributes includes one or more new data streams received from the memory. The analyzing may further include normalization of time, wherein video metrics are adjusted for their time since airing and/or publication.

The one or more input information attributes received from the human operator comprises any subset or combination of a revenue objective, a return on ad spend (ROAS) objective, a web traffic objective, a brand objective, and/or a spend objective and a desired goal for the one or more objectives to be received from the output. The said one or more input information attributes received from the human operator may have a preferred target audience of the output, wherein the preferred target audience is selected from audience data imported from the memory. In addition, the output comprises insights about the relationship between the audiovisual content and one or more performance scores determined from pattern recognition, and a plurality of instructions comprising one or more attributes to be included in a new data stream. The new data stream includes one or more attributes selected from the group of themes, plots, titles, keywords, music tempo, music mood, other music attributes, scripts, storyboards, voiceover features, lighting, sound, number of actors, facial orientation, facial features, facial expressions, gender, voiceover language, accents, emotions, duration, recognized objects, media network and day part, pod position, media program, and other attributes related to the audiovisual content.

The system output further comprises a plurality of past audiovisual content received from the memory. The past audiovisual content comprises past performance scores of the audiovisual content, and one or more performance indicators of the audiovisual content. The memory is configured to store audiovisual content comprising one or more of video, audio, audiovisual, photographic, metadata, text, and numeric data. The analyzing includes one or more data streams of audiovisual content received from a human operator, wherein one or more performance scores are output related to the audiovisual content received from a human operator.

Layman's summary of some key features of the invention:
a. Extracting video, audio, and metadata attributes of one or more existing videos.
b. Measuring performance of said existing video(s) via disclosed novel performance inference methods and/or industry-known methods. Some effectiveness measurement methods include:
  i. A novel time normalization method for measuring online video ad performance.
  ii. A novel search trends deindexing method for measuring TV ad performance
  iii. A novel set of synthetic control methods to create a baseline for comparison of video content using retrospective data.
  iv. A novel method to infer winning attributes from both online and offline video by detecting changes a sponsoring brand makes to their video content over time across a plurality of videos. This allows the invention to infer what the sponsoring brand believes works best without the invention having access to the sponsoring brand's internal performance data.
    1. For example, examining one brand's TV ads across 5 years shows that the brand transitioned their logo to the lower right of their more recent TV ads. The brand has likely tested this change, at large expense to them, and found it works using their internal data. This detection and observation of changes to video content over time enables the invention to infer that the placement of a logo in the lower right may be a win, all without incurring the large testing costs to uncover this insight.
v. A novel method to infer winning attributes from both online and offline video by detecting consistencies and inconsistencies between multiple videos from a sponsoring brand across time.
1. For example, an advertiser recently ran 5 versions of a video ad, each ad variation including a different background scene (in a park, in a parking garage, in a hotel lobby, etc.). After three months, the advertiser released 3 new video ads, each of those three video ads sharing a characteristic from one ad within the original set of 5 (location in a park). The invention infers that this characteristic, a park location, that persisted in subsequent ads may be a win, all without incurring the large testing costs to uncover this insight. The advertiser, at great expense to them, likely AB tested the original 5 video ads and uncovered that the park setting worked best. Without incurring this great expense, the invention uncovered this same learning for its user.
vi. A novel method to infer winning attributes from both online and offline video from detecting duration of an ad run on media in contrast with other ads.
1. For example, an advertiser recently ran 3 different video ads where the linguistic accents of the actors in each video differed. After several weeks, the advertiser stopped running two of the three versions, but kept one version running for 2 months longer. The invention infers that the accent in the version of the ad that the advertiser ran for a longer period of time may be a win. The brand was likely AB testing, at large expense, which accent works best. Without being privy to this data and without incurring the large testing expense, the invention was able to uncover this learning to inform the ads of an invention user.
vii. Use of industry-known methods, some examples which include post-spot lift, ACR data, surveys, panels, geographic tests, and Bayesian structural time series.
c. Training a model to "connect the dots" between inputs (audiovisual attributes) and outputs (audiovisual performance).
d. Scoring and probing said model to identify sets of attributes with predicted higher performance and outputting scores representing such, including in aggregate.
e. Applying filters when training/scoring/probing said model. Can be provided to the invention by a human user (i.e. via a web portal).
i. I.e.—narrowing focus to a metric of interest, an audience of interest (i.e US males aged 20-25), a time period of interest, a topic of interest/disinterest (i.e. exclude nudity)
f. Ranking said sets of attributes and/or attribute aggregates based on said scores.
g. Outputting recommendations in a number of forms/ways.
i. Examples of output mechanisms include but are not limited to a web portal, an email, a phone call, a text message, a presentation, and by word of mouth.
ii. output may be a ranked list, each element being a collection of attributes with/without scores.
iii. output may include examples of prior videos that demonstrate the best/worst predictions.
iv. output may include computer-generated storyboards (images that can be used as starting point for new videos).
v. output may include machine-generated videos or video snippets.
vi. output may be a list of aggregate attributes that, collectively, yield a maximal predicted performance score.
vii. output may be a prediction of effectiveness for an input video.

BRIEF DESCRIPTION OF THE DRAWINGS

Some embodiments of the present invention are illustrated as an example and are not limited by the figures of the accompanying drawings, in which like references may indicated similar elements and in which:

FIG. 8 shows an example of Pattern Recognition 114 shown on FIG. 1 and how data stored in Data Storage 104 is used to detect useful patterns between attributes and performance objectives according to various embodiments of the present invention.

FIG. 10 depicts a visual display to receive input from a human user through Web Portal 118 according to various embodiments of the present invention.

FIG. 13 depicts another visual display of output provided to a human user through Web Portal 118 according to various embodiments of the present invention.

FIG. 15 depicts a method for deindexing search query trends data according to various embodiments of the present invention.

FIG. 16 depicts an example of how embodiments of the present invention detect video performance signals associated with video attributes according to various embodiments of the present invention.

FIG. 17 depicts an example of how embodiments of the present invention detect competitor video test designs, infer competitor-observed results, and use results to infer video performance signals according to various embodiments of the present invention.

FIG. 18 depicts another example of how embodiments of the present invention detect competitor video test designs, infer competitor-observed results, and use results to infer video performance signals according to various embodiments of the present invention.

FIG. 19 depicts a method of weighting inferred video performance signals from competitors' marketing tests using one or more components of the Curriculum Vitae for one or more members of the competitors' teams responsible for conducting said marketing tests according to various embodiments of the present invention.

Figure 1:
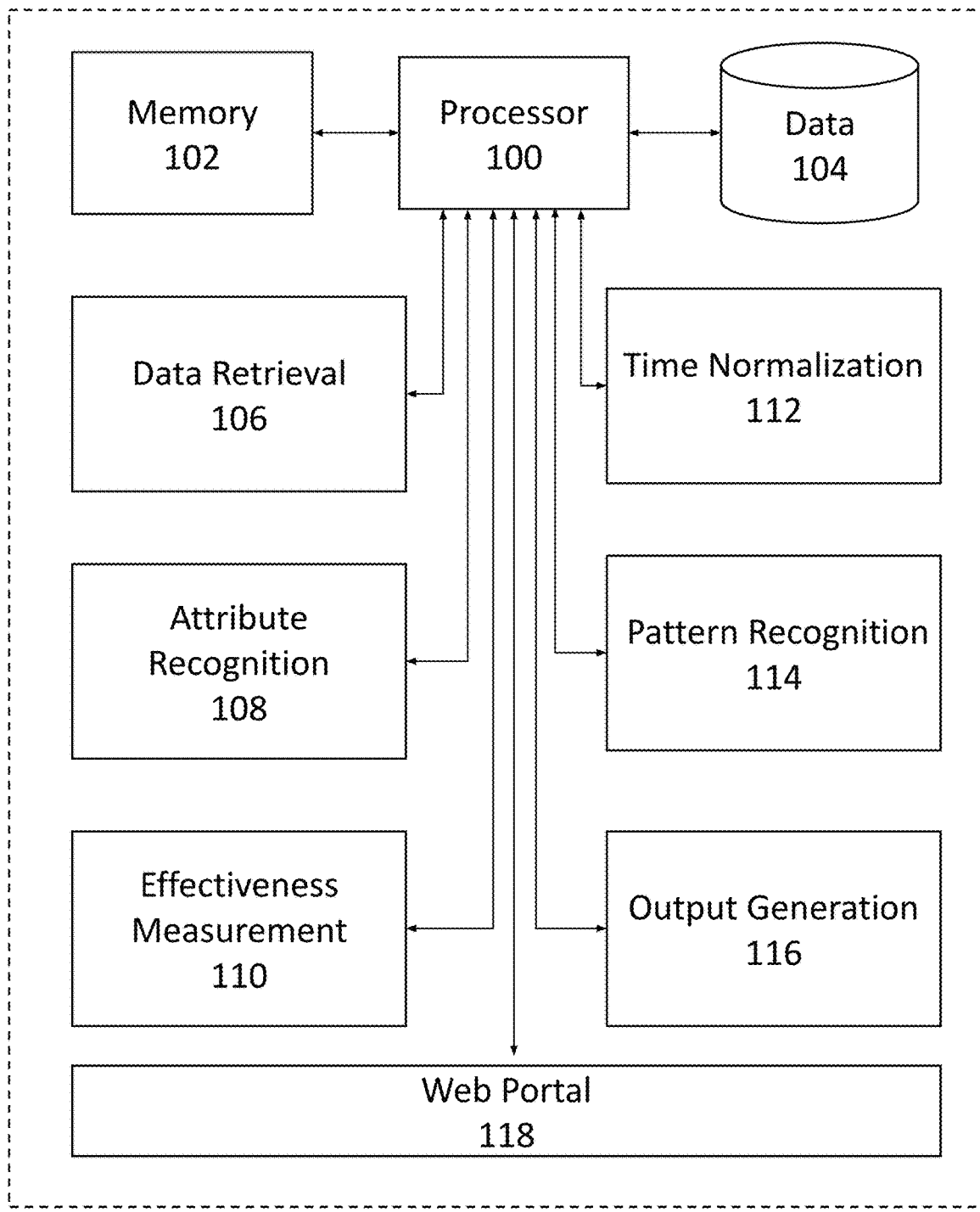
FIG. 1 depicts an overview of one example of a system to predict successful video content according to various embodiments of the present invention.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

Definitions and Terminology

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The following description is not to be taken in a limiting sense but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As used herein, the phrase "plurality" is used interchangeably with the phrase "one or more" and is intended to include both the plural and singular forms of the prepositional object, unless the context clearly indicates otherwise.

Unless otherwise defined, all terms (including mathematical and technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has the individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

As applied herein, the term "video advertising" is used broadly to include paid, earned, and organic video content.

As applied herein, the term "sponsor" means the entity responsible for producing and/or buying media for audio-visual content. For example, if a large insurance company runs television ads related to its product, said large insurance company is the sponsor for said television ads. As another example, if a social media video channel makes videos about cars, said social media channel is the sponsor for each of said videos about cars.

Some examples of paid and organic video content include but are not limited to TV advertisements, digital video ads, video ads on social media, and/or unpaid (organic) video.

The term "video" is used interchangeably with the term "audiovisual" and describes audiovisual recordings, inclusive of audio, visual, and metadata components such as the title, airing timestamp, and video length, associated with the recording.

Audiovisual content may include both advertising and non-advertising content. Audiovisual content may include any of paid, earned, and organic media.

The term "advertising" used herein is defined as one or more audiovisual marketing communications that promotes a product, service, brand, channel, person, and/or idea, including but not limited to television ads, digital video ads, video blogs ("vlogs"), and organic video content.

Some examples of video ads include but are not limited to television ads, movie previews, pre-roll ads, bumper ads, overlay ads, skippable video ads, non-skippable video ads, over-the-top (OTT) ads, native video ads, paid social video, and organic social video.

Some examples of non-advertising video content include but are not limited to TV and/or digital shows, episodes, series, video uploads, and movies.

The audiovisual content may be distributed by any means, examples that include but are not limited to terrestrial broadcast, cable television, IP distribution, peer-to-peer, digital broadcast, over-the-top (OTT), satellite (DTH), streaming services, and other digital channels, including but not limited to social and digital media channels.

The terms "retrieve" and "receive" are used interchangeably throughout descriptions of various embodiments of the invention. All data processing steps described herein may either retrieve data from a source (pull data) or receive data from a source (be pushed data).

The phrase "audience data" is defined herein as information about people who may be targeted for video exposure, including but not limited to demographics (i.e., age, gender, income, language, marital status, education, employment, etc.), geographic location, interests (i.e., cars, cooking, photography, etc.), brand affinities, and/or purchase intentions.

The phrase "target audience" is defined as a group of people possessing one or more desired attributes to be candidates for video exposure. For example, if an advertiser of sports paraphernalia wishes to advertise to only people who watch sports in the US, a target audience for this advertiser may be US-based sports viewers, each member of the audience having the attributes of a US domicile and sports-watching behavior.

The term "channel" is defined as any grouping of video content whereby each element of the video content tends to target a similar audience. In the case of social media, a channel is typically a user's personal and/or brand presence. In the case of television, the term "channel" refers to a television network broadcast in a particular area.

The phrase "performance objective" is defined as any quantifiable goal, examples which include but are not limited to hitting a target related to and/or the increasing and/or decreasing of: revenue, profit, return on ad spend (ROAS), return on investment (ROI), website visits and/or traffic, branded traffic, unique visitors, spend, foot traffic, clicks, click-thru rate, survey metrics, brand metrics, opinions, sentiment, shoppers, and/or sales. The phrase "effectiveness measurement" is defined as a quantification of one or more performance objectives associated with a video.

The phrase "heuristic comparison" includes any technique for labeling at least a part of an audiovisual work and/or the presence and/or absence of at least one attribute in at least a part of said audiovisual work based on said audiovisual similarity to one or more previously recorded media. Some examples of heuristic comparison include but are not limited to supervised learning algorithms like Gradient Boosting Machines (GBMs), Artificial Neural Networks (ANN), including Recurrent Neural Networks (RNN) and Convolutional Neural Networks (CNN), and Support-vector machines (SVM), and unsupervised learning algorithms like K-nearest Neighbors (KNN), Hierarchical Clustering (HC), and Principal Component Analysis (PCA). Any of supervised and unsupervised learning algorithms may be implemented as a deep learning algorithm. Heuristic comparison may be implemented as computer vision (CV) and/or computer audition (CA), including but not limited to object recognition, facial recognition, speech recognition, and named entity recognition.

Some detailed example embodiments are disclosed herein and are provided merely for purposes of summarizing some example embodiments, so as to provide a basic understanding of some aspects of the subject matter described herein. Specific structural and functional details disclosed herein are merely representative for purposes of describing example embodiments. Example embodiments may, however, be embodied in many alternate forms and should not be construed as limited to only the embodiments set forth herein.

Accordingly, it will be appreciated that the described features are merely examples and should not be construed to narrow the scope or spirit of the subject matter described herein in any way. Other features, aspects, and advantages of the subject matter described herein will become apparent from the following Detailed Description, Figures, and Claims.

The invention may be embodied in other specific forms without departing from the spirit of essential characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

Embodiments herein described are not intended to be exhaustive or to limit the invention to the precise form disclosed. It is chosen and described to explain the principles of the invention and its application and practical use to enable others skilled in the art to follow its teachings. A novel system, methods, and processes to predict winning video concepts and attributes before making any investment in producing or displaying the video content are discussed herein.

In the description contained herein, for purposes of explanation, numerous specific details are set forth to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or descriptions provided herein.

The Art of the Present Invention

Those skilled in the art that the present invention is practiced are expected to be senior-level or higher data scientists with terrestrial television and online video marketing expertise.

In a more detailed description, the present invention provides a novel mechanism to avoid the status quo of large upfront video investments and inefficient trial-and-error video marketing by outputting blueprints describing the attributes of video content and/or video media buys most likely to succeed at achieving one or more performance objectives, all before the invention user necessarily spends a penny on video advertising and/or video content creation.

As an example of an embodiment of the invention in use, when the invention was used to predict video themes for a 1.4 M subscriber YouTube channel, the invention output "chocolate-covered grasshoppers" and "NY-style pizza-making techniques" as themes of future videos with the highest probability of success for this channel as measured by views over time. The channel subsequently produced and published a new video around one of the above themes output by the invention, resulting in a video that beat the performance of all other videos the channel had ever produced.

The invention is not limited to video theme; disclosed is the system to produce insights across every attribute related to audiovisual content, some examples which include but are not limited to video duration, the number of actors in the video, the actors' accents, video lighting, audio volume of video, scripts and voiceovers, which TV & video channels to run on, what time of day to run, background music tempo, and mood.

The invention achieves its novel utility, in part, by mining data on the attributes and performances of competitor and other video content already published in public and/or private domains.

Video attributes are joined with measured and/or inferred performance signals, enabling patterns to be mined by the invention that the invention then uses to generate one or more scores predictive of video attributes likely to optimize one or more video performance objectives.

Novel methods for retrospectively inferring performance signals from published third-party video content, including from competitors, is disclosed. In particular, while it may not be possible to directly measure how much revenue a particular video ad made for its sponsoring brand, disclosed are methods to compute "proxy signals" that correlate with revenue and/or profits caused by a video ad. By mining how video attributes relate to these proxy signals, the invention outputs recommendations that are materially equivalent to those that would have been produced had a competitor's exact data, including revenue figures, been directly measured in relation to their video ads. Through this mechanism, the invention enables its users to benefit from each video advertising dollar spent by their competitors.

The invention can sort and/or aggregate video attributes and associated performance scores to predict novel combinations of attributes with the maximum likelihood of achieving the best outcome along one or more performance objectives, including but not limited to performance objectives input by a human user of the invention. In some embodiments, the resulting output of the invention is data about properties of videos, which may include example videos, that are likely to be most effective and/or least effective at achieving one or more performance goals. Output may be presented in list form alongside predictive scores related to one or more video attributes and/or combinations thereof. Examples of past videos that most and/or least conform to the invention predictions may be output.

Rather than fail 97% of the time, the invention flips this dynamic by outputting blueprints for video content that is likely to succeed at achieving one or more performance objectives, such as boosting sales, traffic, or brand awareness, for example.

As a further improvement over the prior art, various embodiments of the invention enable users to learn from competitors' and/or third-party audiovisual media spend. Since the status quo "trial and error" approach has a high failure rate, a user of the present invention can let competitors waste precious resources identifying winning from mostly failing video concepts while the user of embodiments of the invention only runs with winning concepts and other insights derived from the competitor spend. Removal of this learning tax provides a sizable competitive advantage, representing a substantial improvement over the status quo and limited prior art.

The invention creates a novel financial benefit for its users by enabling companies to benefit from their competitors' marketing spend. The more a competitor spends on video marketing, the greater the benefit for users of the invention. This novel benefit of the invention is made possible by the invention reducing the cost-to-learn ratio of video to near zero. While status-quo advertisers continue to incur the high cost of producing and testing video ads and other video content that will mostly fail so that they may find the "needles in the haystack," the invention outputs "predicted needles" without necessarily requiring any spend from its users.

Embodiments of the present invention may use computer vision and computer audition to extract attributes from audiovisual data. Text mining may extract features from audiovisual metadata, closed captioning, subtitles, and/or other text associated with video. Machine learning recognizes patterns between one or more mined audiovisual features and one or more performance metrics. Recognized patterns are used to compute optimized recommendations for new video ads and/or other audiovisual content that are likely to achieve one or more desired performance objectives.

A system for predicting attributes of video advertisements and audiovisual content that meet one or more performance objectives is disclosed. The system is configured to retrieve one or more data streams of audiovisual content from one or more public or private domains. The system can analyze the one or more data streams to determine one or more attributes representative of the one or more data streams. The system can determine one or more performance scores associated with one or more data streams. The system can attribute one or more performance scores, at least in part, to at least a portion of one or more attributes, wherein one or more performance scores across one or more attributes may be sorted, filtered, and/or aggregated to compute an aggregate of attributes that comprises a highest performance score. The system can output, to a memory, an aggregation of attributes that comprises a highest performance score.

In one embodiment, the output provides a recommendation of a topic based on a retrieved stream in the one or more data streams.

In another embodiment, the system further includes generating a new data stream of audiovisual content as a result of the output.

In another embodiment, the one or more data stream comprises competitor data and/or third-party data.

In another embodiment, the analyzing is based on one or more input information attributes received from a human operator, wherein the input information attributes include one or more new data streams received from the memory.

In another embodiment, the one or more input information attributes received from the human operator comprises a revenue target, and a desired goal for the revenue target to be received from the output.

In one embodiment, the one or more input information attributes received from the human operator comprises a return on ad spend (ROAS) target, and a desired goal for the ROAS target to be received from the output.

In one embodiment, the one or more input information attributes received from the human operator comprises a spend objective and a return on ad spend (ROAS) target, and a desired goal for the spend objective and ROAS target to be received from the output.

In one embodiment, the one or more input information attributes received from the human operator comprises a brand lift target, and a desired goal for the brand lift target to be received from the output.

In one embodiment, the one or more input information attributes received from the human operator comprises a web traffic target, and a desired goal for the web traffic target to be received from the output.

In one embodiment, the one or more input information attributes received from the human operator comprises a preferred target audience of the output, wherein the preferred target audience is selected from audience data imported from the memory.

In one embodiment, the output comprises insights about the relationship between the audiovisual content and one or more performance impacts of the audiovisual content determined from pattern recognition.

In one embodiment, the output comprises a plurality of instructions comprising one or more attributes to be included in a new data stream.

In one embodiment, the new data stream includes one or more attributes selected from the group of themes, plots, number of actors portrayed in the audiovisual content, facial orientation, facial features, gender, accents, and emotions expressed by portrayed in the audiovisual content, duration of the content, music tempo, and mood of music.

In one embodiment, the output comprises a plurality of past video content received from the memory.

In one embodiment, the past video content comprises past performance scores of audiovisual content, and one or more performance indicators of the audiovisual content.

In one embodiment, the memory is configured to store audiovisual content comprising one or more of video, audio, audiovisual, photographic, text, and numeric data.

Embodiments of the invention output a blueprint and/or examples of video concepts and attributes most likely to yield a desired effect that is specified by the user of an embodiment of the invention. Embodiments of the invention mine data from past videos, across content producers and/or distributors, in the TV and digital video realms, to inform the output.

Embodiments of the invention enable users to learn from competitors' and third-party video media spend. The more a competitor spends on video media, the greater the advantage for users of the various embodiments.

In one embodiment of the invention, attributes of pre-existing videos are gathered, parsed, and analyzed alongside the measured impact the pre-existing videos yielded, such as increasing sales or website traffic. One or more combinations of video attributes likely to maximize or minimize a desired effect are computed and displayed. Examples of video attributes include but are not limited to video topics, motion, color, audio attributes (i.e., volume, tempo, pitch, etc.), number of actors portrayed in the video, color schemes, voiceover accents, video length, facial expressions of actors, facial positioning, and metadata attributes (i.e., title, description, rating, etc.). Examples of measured impact include but are not limited to incremental website visits caused by the video ad, revenue, sales, views, and increases to search volume for the brand or topic displayed in the video ad, and changes in customer attributes.

In one embodiment of the invention, already produced audiovisual content may be scored, the score indicative of how said audiovisual content is likely to perform on one or more performance objectives.

The present invention differs and is a substantial improvement from what currently exists. Unlike the prior art, the described invention predicts which video content is likely to succeed before a single dollar is invested in producing or running the video content. Since a large percentage of video content fails to achieve desired objectives, the prior art necessitates making capital expenditures, much of which will be wasted dollars and time. Turning to FIG. 1, the version of the invention discussed includes: a processor 100, memory 102, data storage 104, data retrieval 106 and attribute recognition 108. Also described in the present are effectiveness measurement 110, time normalization 112, pattern recognition 114, output generation 116 and web portal 118.

Relationship Between the Components

As shown in FIG. 1, Processor 100, Memory 102, and Data Storage 104, collectively able to store and execute software instructions to perform data science computations, are used to gather historic audiovisual and other data from the public and/or private domains using Data Retrieval 106. Data Retrieval 106 may use web scraping, APIs, file imports, database calls, and/or any other means to retrieve data. The data retrieved by Data Retrieval 106 may include, for example, existing audiovisual content, metadata about the audiovisual content, and/or information related to measuring the impact of the audiovisual content, including audience data. The data retrieved by Data Retrieval 106 is stored into Data Storage 104 and may include video, audio, audiovisual, photographic, text, numeric data, and/or any other retrieved information.

The audiovisual data retrieved by Data Retrieval 106 and stored in Data Storage 104 may be transformed into alternative representations using Attribute Recognition 108.

Alternative representations of data yielded by Attribute Recognition 108 may include attributes measured on the audiovisual content, some examples that including but are not limited to text attributes derived from ad copy displayed or spoken as part of the video, topics, themes, plot and story lines, number of actors portrayed in the audiovisual content, facial orientation, facial features, gender, accents, and emotions expressed by portrayed in the audiovisual content, duration of the content, music tempo, and mood of music.

The output of Attribute Recognition 108 is stored in Data Storage 104 and may include textual, numeric, and/or other data types. Effectiveness Measurement 110 retrieves data from Data Storage 104 that was gathered by Data Retrieval 106 and processes the data to quantify the effectiveness of existing audiovisual content. Some examples of metrics computed by Effectiveness Measurement 110 include but are not limited to changes in the following metrics caused by the audiovisual content: website traffic, foot traffic, clicks, click-thru rate, views, subscribers, viewer or market perceptions, opinions, or sentiment, shoppers, sales, revenue, profit, and/or ROI.

Time Normalization 112 retrieves data from Data Storage 104 and computes metrics that yield statistical control for differences in airing timestamps and/or publication dates across audiovisual data. Output from Time Normalization 112 is stored to Data Storage 104. Pattern Recognition 114 is applied on data stored in Data Storage 104 to identify relationships between any combination of audiovisual data attributes output by Attribute Recognition 108 and any combination of audiovisual effectiveness measurements output by Effectiveness Measurement 110 or Time Normalization 112, the results of which are stored to Data Storage 104.

In one embodiment, data stored in Data Storage 104 or output from Data Retrieval 106, Attribute Recognition 108, Effectiveness Measurement 110, Time Normalization 112, Pattern Recognition 114, and/or Output Generation 116 is displayed to a user through Web Portal 118. Optionally, a human operator may input information about one or more desired goals for one or more new videos via Web Portal 118 using any input device; the input information is retrieved by Data Retrieval 106 and stored to Data Storage 104. An example of data that may be input by a human operator includes but is not limited to the operator selecting a target of "revenue" from a graphical drop-down menu rendered by Web Portal 118, then inputting a desired goal for that target via a textbox rendered by Web Portal 118. The input information may specify one or more target audiences. Data Retrieval 106 may import target audience data.

Output Generation 116 assembles insights about the relationships between audiovisual attributes extracted by Attribute Recognition 108 and quantified performance impacts output by Effectiveness Measurement 110, said insights the output of Pattern Recognition 114, then displays insights to a human user via Web Portal 118. Insights output by Output Generation 116 may include but are not limited to text-based instructions conveying attributes recommended for inclusion a new video such as topics to include, themes, plots, number of actors portrayed in the audiovisual content, facial orientation, facial features, gender, accents, and emotions expressed by portrayed in the audiovisual content, duration of the content, music tempo, and mood of music.

In some embodiments of the invention, Output Generation 116 includes examples of past video content. The examples of past video content may include scores or other assessments of how well the past video content would work to achieve the goals input by a human user into Web Portal 118.

In some embodiments of the invention, Output Generation 116 outputs new machine-generated content, including video snippets and/or screenshots.

In some embodiments of the invention, Web Portal 118 may be substituted with any means for a human to input and/or receive data, including via email and word-of-mouth.

Embodiments of the invention output a blueprint for constructing new audiovisual content, such as a TV ad, digital video ad, or organic video content, that the embodiment predicts will outperform on one or more performance goals. For example, if a human operator desires to design a TV ad that will maximize website traffic over the next 30 days to his/her brand, embodiments of the invention accept this input and output information about which attributes must be included and/or excluded in new TV ad content to cause website traffic to be maximized over the next 30 days.

In various embodiments of the invention, the existing audiovisual content contains or comprises competitor and/or third-party data. One example of existing audiovisual content is a TV advertisement that was developed by a competitor. Data from the existing audiovisual content contains or comprises hidden information about what works and does not work for varying markets, audiences, and metrics. For example, video ads with a single male actor having a British accent and high tempo background music of 170 beats per minute may maximize website traffic to an auto dealership for a male demographic. In contrast, a video ad displaying two female actors discussing the importance of family while emotional violin music plays in the background may correspond with maximum website sales for florists around Mother's Day in the US.

By parsing historic video content into constituent attributes and applying pattern recognition to quantify how those attributes correspond with impacts observed to have been caused by those historic videos, embodiments of the invention identify the audiovisual characteristics most likely to maximize and/or minimize input target objectives. The output provided by embodiments of the invention is intended to be used to construct new audiovisual content that is optimized to outperform on the input target objectives.

How to Make the Invention

To make this invention, one must craft software that is able to complete the requisite tasks and provide the user with the useful insights described hereinabove. In one embodiment, the programming languages Python and R are used. Both audiovisual content and information about the effects of the same audiovisual content are gathered through web scraping using Selenium, lxml, and Python's Beautiful Soup library. Additional data is retrieved via API from technology partners. Python libraries Pandas, Keras and Skimage are used to extract video features and store them to a Postgres database via SQLAlchemy. Python's OpenCV library is used to further parse visual features. Python's Tensorflow library is used to train models that recognize objects in frames output by processing of video using OpenCV and Python's imutils library. ImageAI and dlib may alternatively and/or additively be used for object recognition.

Python library Librosa is used to extract audio features, including but not limited to Mel-Frequency Cepstral Coefficients. Among other methods, data about how a video impacts various metrics are retrieved from Google trends, scraped from the web, computed based on website traffic patterns, and/or retrieved through a third-party.

Time normalization enables videos to be fairly assessed despite having been published at differing times. On most digital video platforms, videos published later in time benefit from the subscribers and/or brand attention generated by earlier videos. This time effect biases video assessment and subsequent steps; if two near-identical videos are published, the later video often achieves better performance due to the time effect rather than any properties intrinsic to the video itself. Removing this time effect is desirable so that video attributes may be assessed fairly. To control for time, a statistical or machine learning algorithm is used, such as an ARIMA, LSTM and/or a GLM.

Figure 7:
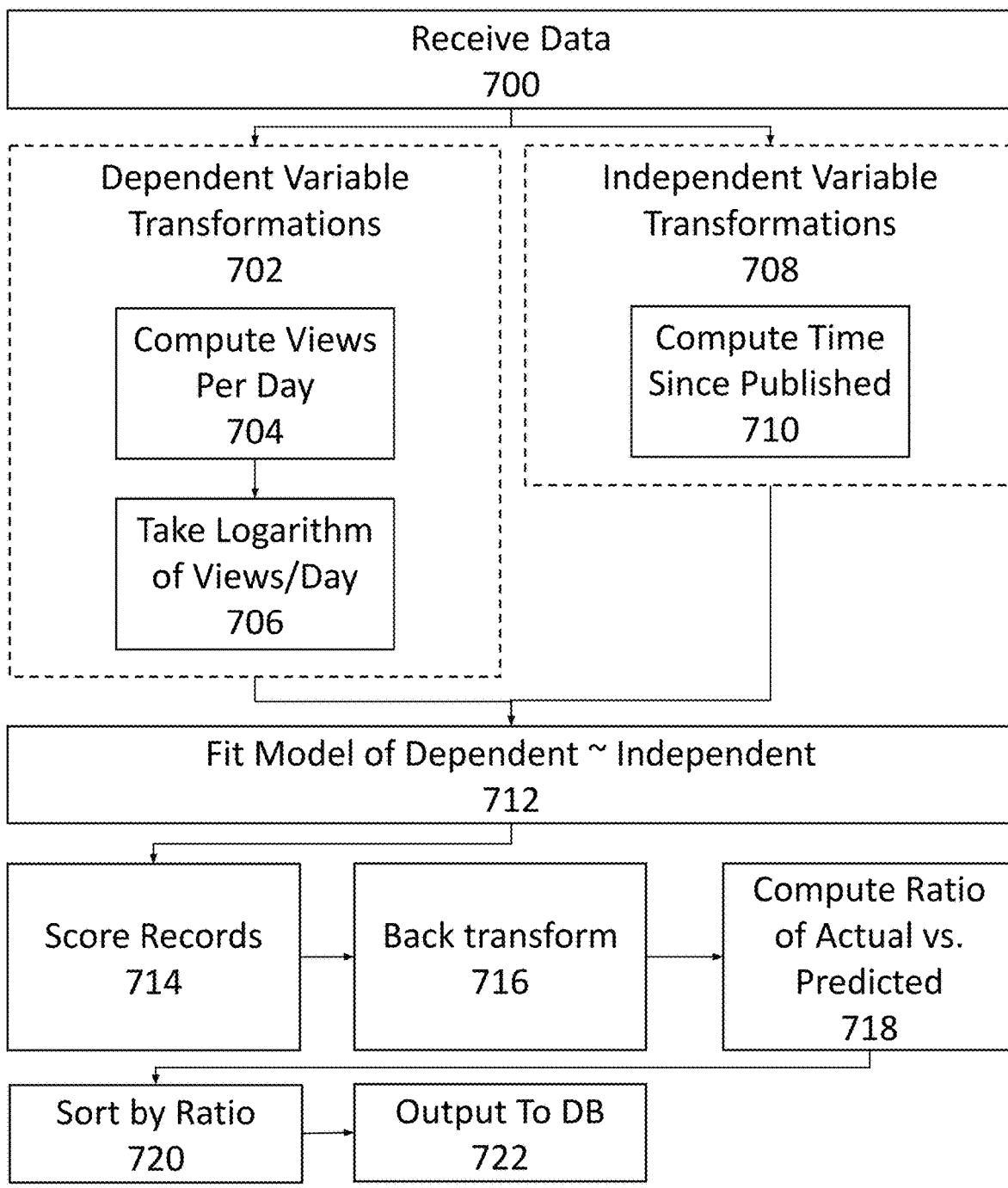
FIG. 7 depicts an expanded view of Time Normalization 112 shown on FIG. 1 and how mathematical transformations related to metrics in time are processed according to various embodiments of the present invention.

FIG. 7 illustrates how mathematical transformations related to time are processed according to various embodiments of the present invention.

In one embodiment, each record processed by Time Normalization 112 represents one historic video as taught in FIG. 1 of the present invention.

In another embodiment of the invention according to FIG. 7, Received Data 700 undergoes Dependent Variable Transformations 702 and/or Independent Variable Transformations 708. One example of a transformation is taking the logarithm of the dependent variable. Both Dependent Variable Transformations 702 and Independent Variable Transformations 708 are performed to help satisfy statistical and/or machine learning assumptions made by the model architecture used in Model Fitting 712. For each existing video, views per day 704 is computed. A logarithmic transformation 706 is applied to the output of views per day 704. Time Since Published 710 is computed for each video by taking the difference between the current date that the Time Normalization 112 is running, and the publication date of the video being processed. Any arbitrary date can be used in place of the current date.

Model Fitting 712 is performed using a general linear model (GLM) with gaussian error to regress the log of video views per day onto days since publication. Records are scored with Score Records 714 using the result of Model Fitting 712 as an input. Scores are back transformed 716 to yield a predicted number of views per day for each video that controls for time. For each record, a ratio 718 is computed by dividing the actual views per day by the result of back transformation 716. Larger values of ratio 718 are indicative of videos performing better than expected after controlling for time. Records may be sorted, ranked, and/or subset using ratio 718. Records may be output 722 to the Data Storage 104. Records may be sorted 720, ranked, and/or subset using ratio 718. Records may be output 722 to the Data Storage 104 as in FIG. 1.

In an alternative embodiment, ratio 718 is not needed and Model Fitting 712 may be restructured to work in conjunction with Score Records 714 to directly output a score that indicates the time-adjusted metric for each record. As one example, a Bayesian Hierarchical Model may be used.

How Embodiments of the Invention Identify Video Attributes Likely to Perform

In one embodiment of the invention, a machine learning algorithm, gradient boosting machines provided by R's or Python's xgboost package, is fit to identify relationships between audiovisual features and the impact of the same audiovisual content. This trained model is saved on disk and probed by computing SHAP values, revealing combinations of features most likely to achieve an input target metric.

FIG. 8 reveals a simple example of how embodiments of the invention apply Pattern Recognition 114 to achieve the specified insights. In some embodiments, data stored to Data Storage 104 is structured as one row per video 800; the video data having been gathered by Data Retrieval 106 and processed by Attribute Recognition 108. Output from Time Normalization 112 that is stored to Data Storage 104 may also be included as an input label to Pattern Recognition 114. In FIG. 8, 804 depicts audiovisual attributes, including the # of actors 804a appearing in the video specified by Video ID 802 and the Actors' Accent 804b, that are the output of Attribute Recognition 108. 806 depicts impact variables that are the output of Effectiveness Measurement 110 of FIG. 1. Performance Variables 806, which may be referred to as "dependent variables" or "Y variables" in the statistics discipline and "target" or "output variables" in the machine learning discipline, are the result of Effectiveness Measurement 110 and/or Time Normalization 112. Performance Variables 806 represent the impact that Video ID 802 had on the measured audience.

806a reveals the Revenue Lift observed on a Male Audience for each specified video. In 806a, "Male" is the audience that the impact was measured on. 806b reveals the Revenue Lift on a Female Audience, 806c reveals the Search Lift on a Male Audience and 806d reveals the Search Lift on a Female Audience. Model Fitting 808 is performed using audiovisual features 804 as input features and one or more of Performance Variables 806 as targets (labels) for model training. As part of Model Fitting 808, data may be partitioned into test and training sets. Cross validation may be applied to prevent over-fitting.

Recognized Pattern Examples 810 depicts insights that may be revealed by Model Fitting 808 via probing techniques, including but not limited to computing SHAP values. 810a shows how Model Fitting 808 uncovers that a video with 2 actors having British accents may maximize revenue on a male audience. Visual inspection of column 806a confirms this insight. 810b reveals how Model Fitting 808 uncovers that a video with 1 actor having French accent may maximize search lift on a female audience. Visual inspection of column 806d confirms this insight. FIG. 8 is an intentionally simplified example that has been designed to help illustrate the methods used by various embodiments of the invention. In practice, Recognized Patterns 810 are rarely obvious and are often counterintuitive, often challenging conventional wisdom held by experts in the art.

Figure 22:
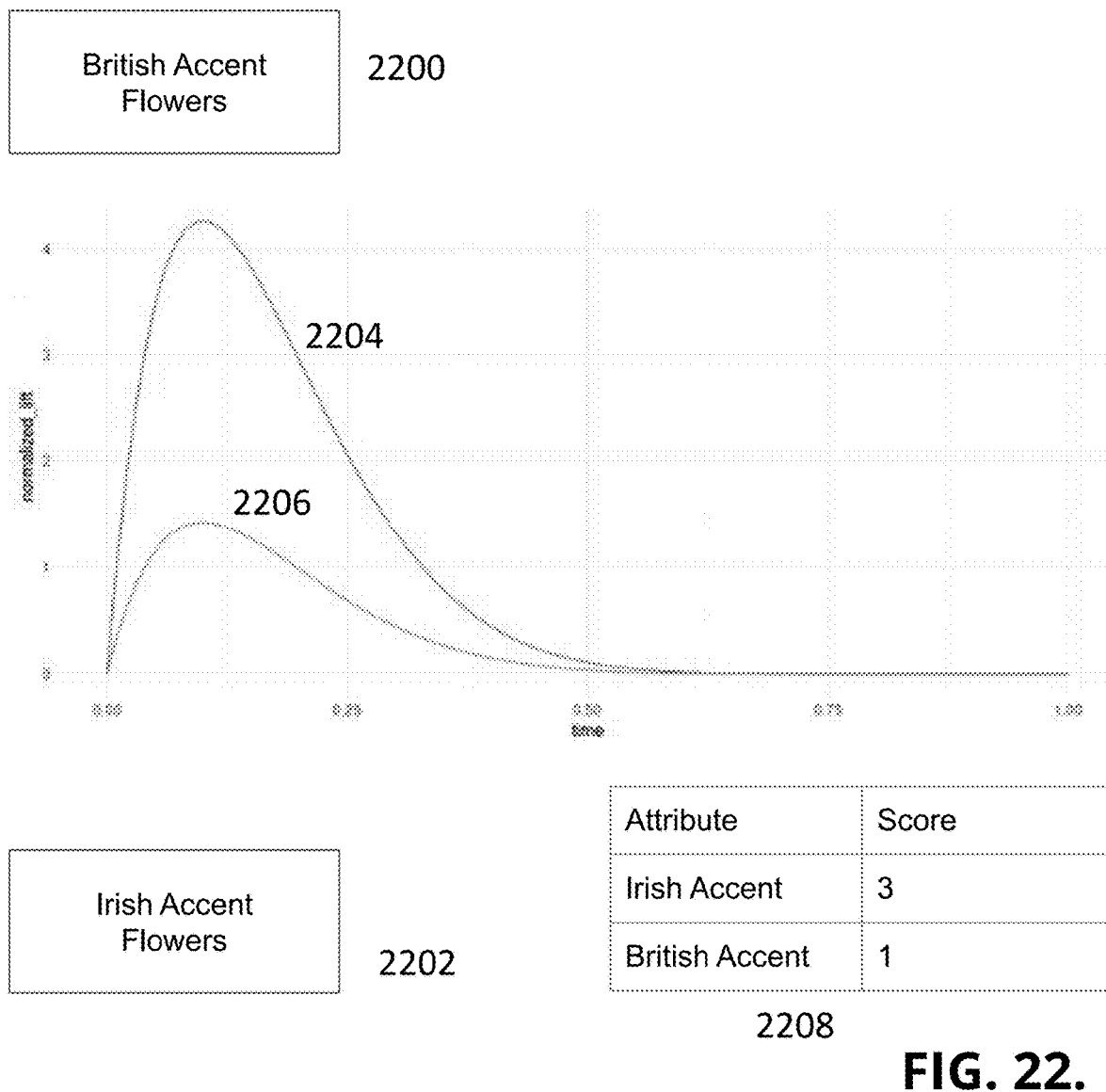
FIG. 22 depicts an example visual representation of Pattern Recognition 114 using output from Audio Data Processor 202, Visual Data Processor 204, and Effectiveness Measurement 110, the former two providing features and the latter Effectiveness Measurement 110 providing labels for Pattern Recognition 114 machine learning algorithms according to various embodiments of the present invention.

FIG. 8 may be further understood by referring to the visual representation of Pattern Recognition 114 as shown in FIG. 22. Videos 2200 represent a set of videos that all have output from Audio Data Processor 204 indicating one or more actors with a British accent and output from Visual Data Processor 202 indicating flowers having been visually detected in said videos. Videos 2202 represent a set of videos that all have output from Audio Data Processor 204 indicating one or more actors with an Irish accent and output from Visual Data Processor 202 indicating flowers having been visually detected in said videos. Aggregating the Lift Caused By Ad 606 outputs of Effectiveness Measurement 110, for each of the videos in Videos 2200 may produce Curve 2204, depicting an aggregation of Lift Caused By Ad 606 across Videos 2200. Similarly, aggregating the outputs of Effectiveness Measurement 110 for each of the videos in Videos 2202 may produce Curve 2206, depicting an aggregation of Lift Caused By Ad 606 across Videos 2202. Through the operation of Pattern Recognition 114 as further elucidated in FIG. 8, Curve 2204 and Curve 2206 may be compared via Model Fitting 808, the result of said comparison being Scored 902 and Ordered 904 among other operations of Output Generation 116, yielding Ranked Output 2208. In the example, the operation of Order Results 904 comprises computing the area under each curve and dividing by the area under the smallest curve, the quotients representing scores that are ranked and displayed in Output 2208 through Web Portal 118, along with additional Supplemental Metrics 906. The invention determines and reveals that Irish Accent, as found in Videos 2202, has three times more lift than British Accent.

It should be noted that FIG. 22 is a simplified example for illustration purposes only. Specifically, the example has been simplified in two key ways: 1) the example depicts a univariate analysis; most commercially-viable embodiments of the invention have Pattern Recognition 114 using multivariate technique to assess many attributes at once and how the attributes interact with one another such as via a Gradient Boosting Machine (GBM) and calculation of SHAP values, and 2) a simplified aggregation of summing lifts across videos is shown; most embodiments of the invention use a machine learning technique in lieu of simple aggregation. In some embodiments of the invention, a Gradient Boosting Machine (GBM) is used to perform Pattern Recognition 114, as implemented via the XGBoost algorithm for Model Fitting 808. Labels 806 resulting from the output of Effectiveness Measurement 110 are used to train the XGBoost fit alongside attributes output by Attribute Recognition 108 as visually represented by Attributes 804. The XGBoost model fitted on example Data 800 is probed using SHAP, the SHAP values yielding scores, an example which is shown in Output 2208 of FIG. 22.

Figure 2:
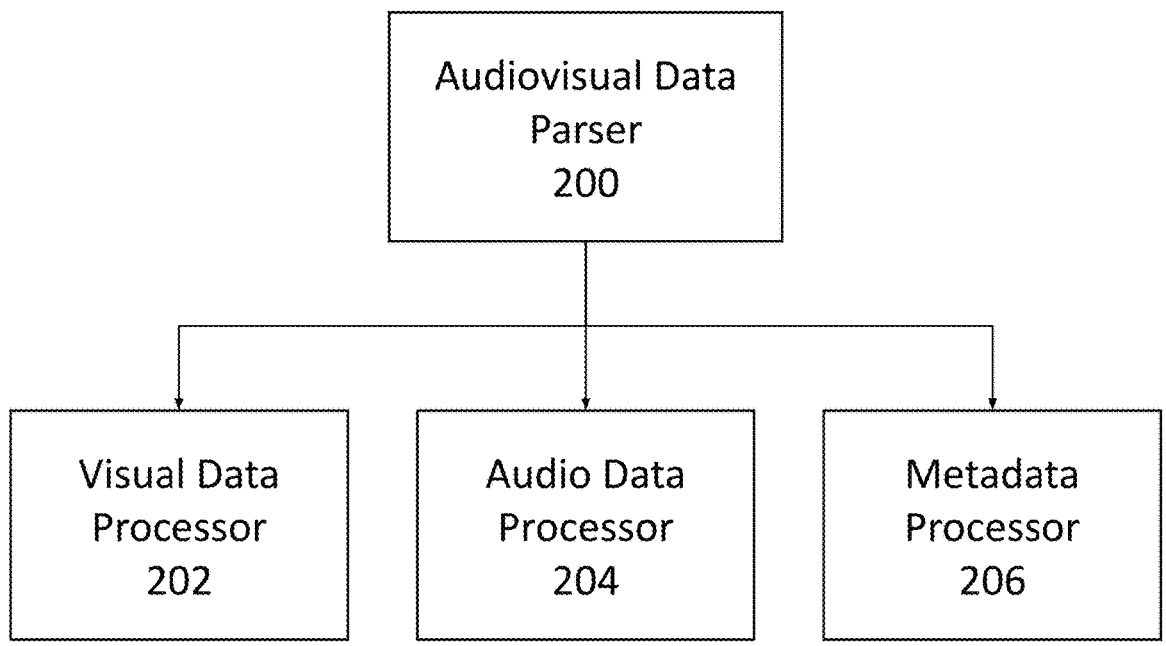
FIG. 2 shows an expanded view of Attribute Recognition 108 as first shown on FIG. 1, including depicting how visual, audio, and metadata from audiovisual content is processed according to various embodiments of the present invention.

How Attribute Recognition 108 Works (FIG. 2)

In some embodiments of the invention, Attribute Recognition 108 extracts data from video content using artificial intelligence; the data is used by Time Normalization 112 and/or Pattern Recognition 114. In some embodiments, artificial intelligence comprises Computer vision (CV) and/or computer audition (CA), including but not limited to object recognition, facial recognition, speech recognition, and named entity recognition.

Figure 3:
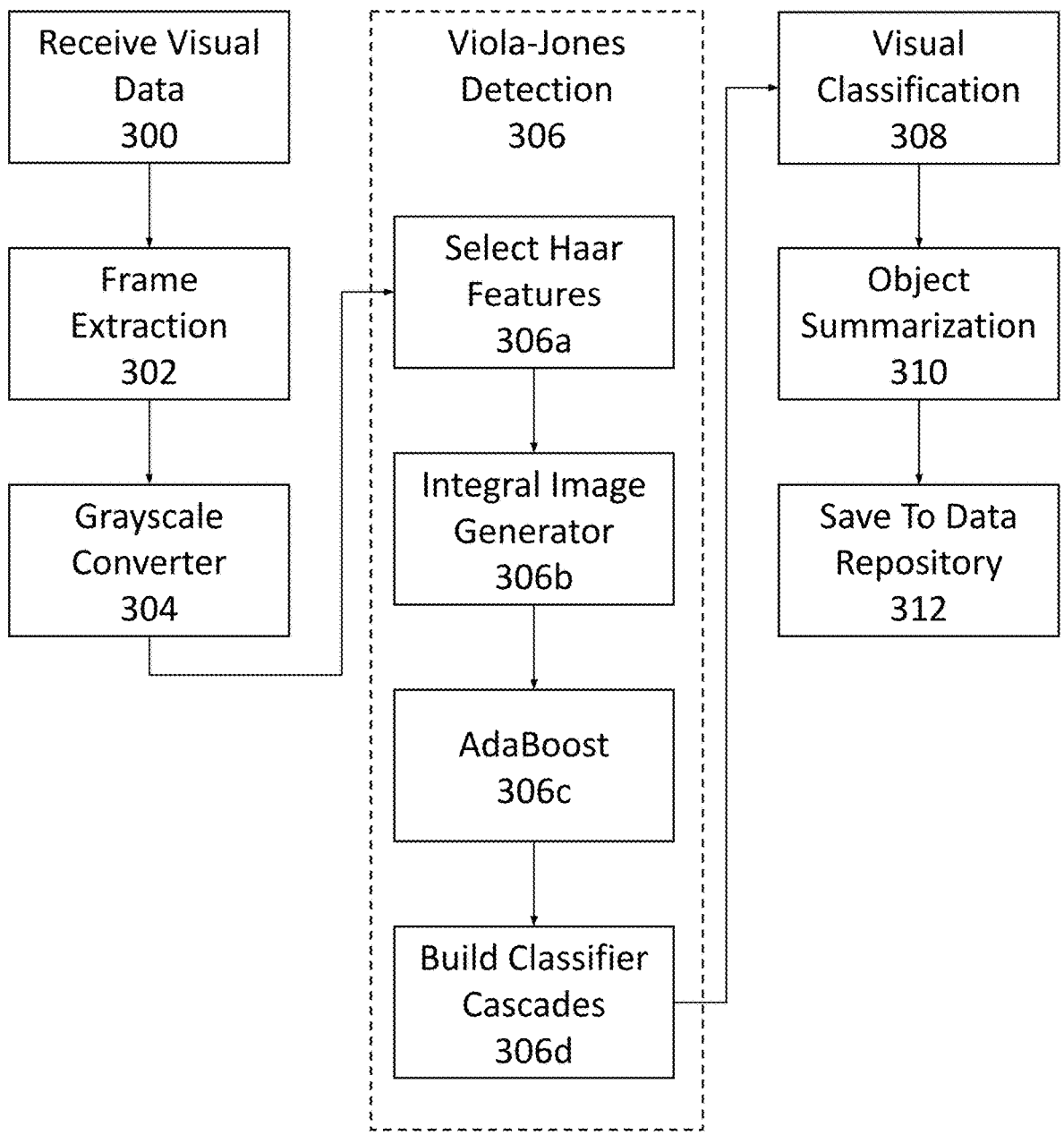
FIG. 3 depicts an expanded view of Visual Data Processor 202 shown on FIG. 2, including how visual data is processed according to various embodiments of the present invention.
Figure 4:
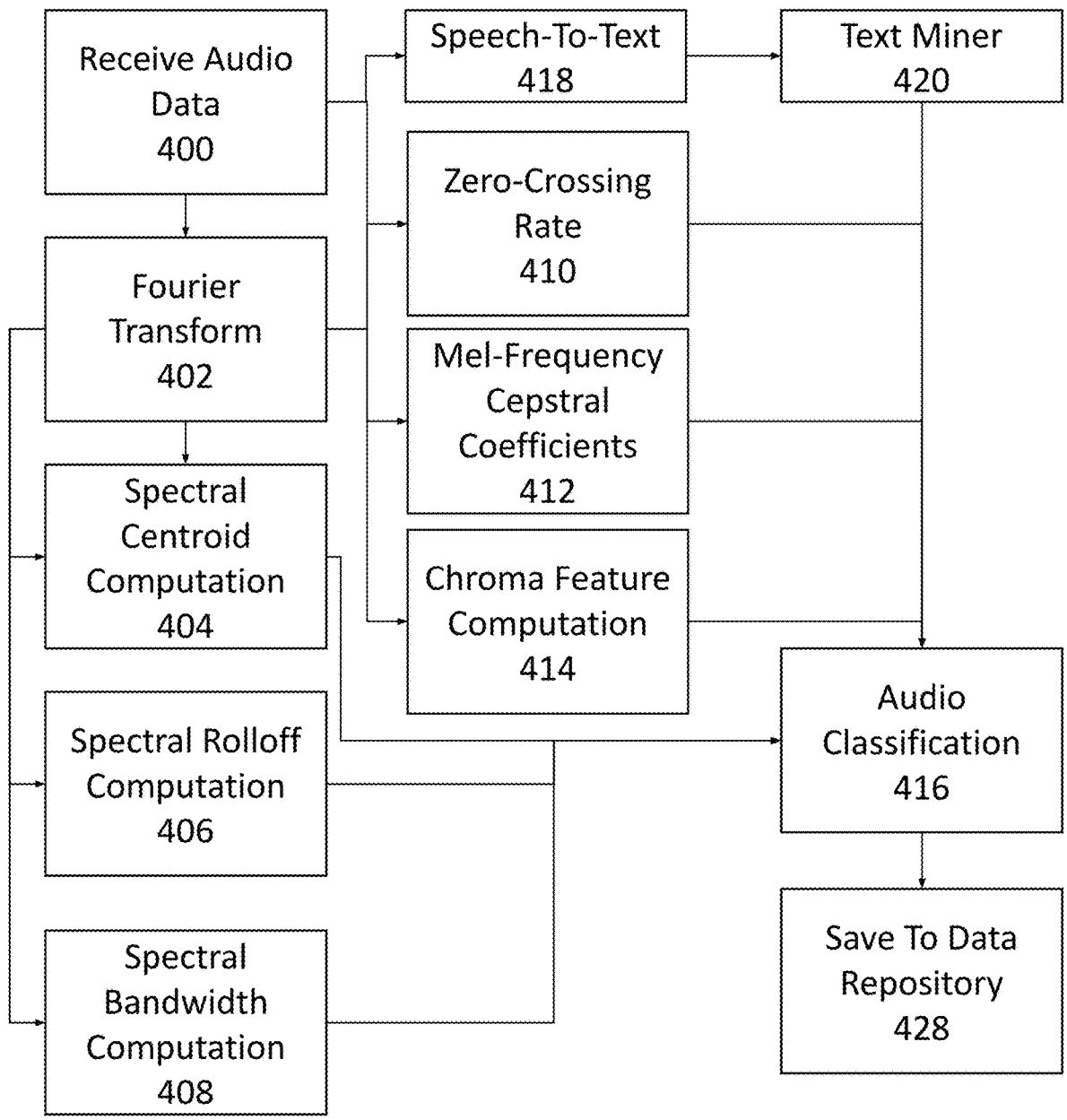
FIG. 4 shows an expanded view of Audio Data Processor 204 shown on FIG. 2, including how audio data is processed according to various embodiments of the present invention.

According to FIG. 2, Audiovisual Data Parser 200 may split audiovisual data into separate visual, audio, and metadata data substreams. Each data substream may be analyzed and processed independently, including on different hardware and/or virtual machines in parallel. In one embodiment, Visual Data Processor 202 uses computer vision to automatically detect that there are, for example, two actors portrayed in a video. FIG. 3 further illustrates the functioning of Visual Data Processor 202 with one example analysis from the operation of Visual Data Processor 202 shown in FIG. 21. Audio Data Processor 204 uses computer audition to detect, for example, that there are two distinctive voices portrayed in the audio component of the audiovisual and that the actors are using a specific accent in their speech. FIG. 4 further illustrates the functioning of Audio Data Processor 204 with one example analysis from the operation of Audio Data Processor 204 shown in FIG. 20.

Figure 5:
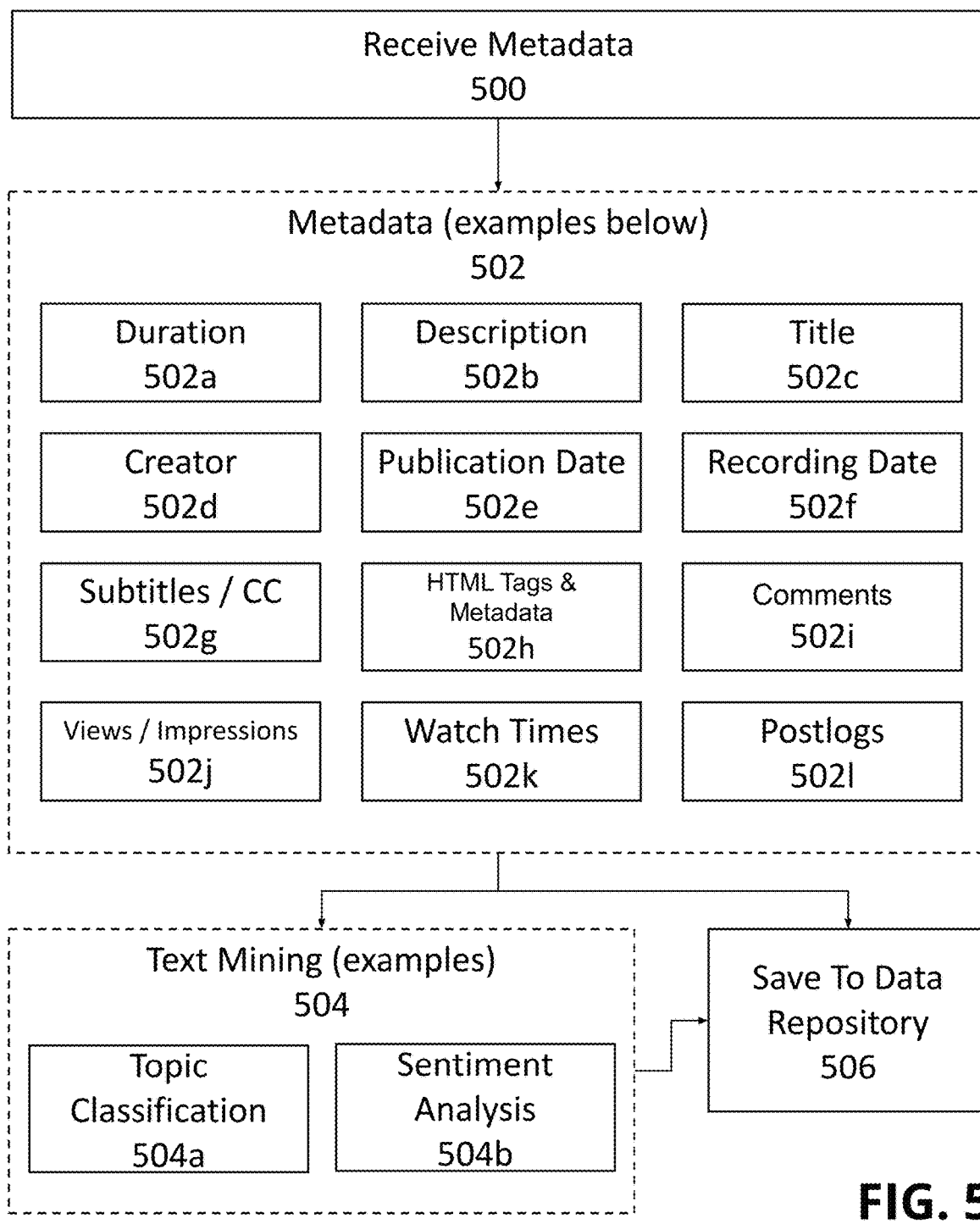
FIG. 5 depicts an expanded view of Metadata Processor 206 shown on FIG. 2, including how metadata related to video content is processed according to various embodiments of the present invention.

Metadata Processor 206 analyzes data about the audiovisual content, examples of which include the video title and publication date. In some embodiments, text mining is used to extract additional features from text-based data that may be used by Pattern Recognition 114. FIG. 5 further illustrates the functioning of Metadata Processor 206.

Audiovisual Data Parser 200 may retrieve data from Data Storage 104 and/or store output data to Data Storage 104. In some embodiments, Audiovisual Data Parser 200 stores data to Data Storage 104 before the data is further processed by Visual Data Processor 202, Audio Data Processor 204, and/or Metadata Processor 206. In some embodiments, any of Visual Data Processor 202, Audio Data Processor 204, and/or Metadata Processor 206 may directly receive data from Audiovisual Data Parser 200 without an intermediate data read/write to Data Storage 104.

Visual Data Processor 202 is further elucidated in FIG. 3. In one embodiment of the invention, Visual Data Processor 202 receives and/or retrieves visual data 300 stored in Data Storage 104. Python libraries OpenCV, scikit-learn, and scikit-image are used for visual data analysis. Frame Extraction 302 extracts individual frames from the visual data. In one embodiment, this is achieved using the VideoCapture, read, and/or imwrite methods contained within the OpenCV library. These frames may be stored to Data Storage 104 in any reasonable image format, examples that include jpeg and png. Grayscale Converter 304 converts color images output by Frame Extraction 302 and/or retrieved from Data Storage 104 to grayscale and/or black and white images. Some embodiments exclude Grayscale Converter 304. Some embodiments include image scaling and/or resizing. In some embodiments, this Grayscale Converter 304 uses the color.rgb2gray method in the scikit-image library. Alternative embodiments may use the io.imread method in scikit-image, the Pillow library, and/or any other method to achieve similar function. In some embodiments, a Viola-Jones Detection Framework 306 may be applied to the visual data and/or processed components thereof to detect and/or label objects shown within the visual data. The OpenCV library in Python may be used, including pre-trained classifiers for various objects. The Tensorflow library may be used to train one or more classifiers and/or implement one or more pre-trained classifiers.

Examples of objects that may be detected using Viola-Jones Detection Framework 306 include but are not limited to faces, people, vehicles, landscapes, backgrounds and settings (i.e., the beach, in a vineyard, on a highway, the ocean, the moon, Mars), props (i.e., a can of soda, a flower, a loaf of bread), and any other items that may be recognizable by a human (i.e.; a table and chairs, a wristwatch, a smartphone). Some embodiments of the invention apply the Viola-Jones Detection Framework 306 as a series of steps to assist with object recognition, improve object recognition, and/or to train embodiments of the invention to identify new objects via supervised learning. Using grayscale images produced by Grayscale Converter 304, the first step of Viola-Jones Detection Framework 306 is to Select Haar Features 306*a*. Haar-like features are rectangular regions on the image that help reduce computational requirements of subsequent recognition steps. Integral Image Generator 306*b* then sums pixel intensities in each rectangular region and the difference between these sums are computed. AdaBoost 306*c* uses adaptive boosting for training, evaluating output of Image Generator 306*b* along with known object labels. Classifier Cascades 306*d* may be constructed using the output of AdaBoost 306*c* to reshuffle weak learners and apply them in stages, prioritizing the best performing learners to run first and discarding components of the image data from analysis by all weak learners if it is detected in earlier stages that the data does not add value to the recognition. This has the effect of reducing computational load.

Visual Classification 308 scores image data derived from Visual Data 300, applying labels on objects detected in the image. The inputs to Visual Classification 308 may be image data for scoring, including the output of Grayscale Converter 304, and a trained cascade classifier and/or any trained object recognition model. The cascade classifier and/or trained object recognition model may be built using Viola-Jones Detection Framework 306 and/or imported from a third-party. The CascadeClassifier and detectMultiScale methods contained within the OpenCV library may be used to achieve this step in some embodiments. Object Summarization 310 aggregates information from previous processing steps in Visual Data Processor 202 to arrive at a summary of detected objects per video. As one example, if a ball is observed in one frame of the video and a car is observed in another frame, Object Summarization 310 would output that the video includes both a ball and a car. Information about each object, including but not limited to the timestamp for when it appears in the video, other objects recognized as present alongside it and/or in the same frame, and for how long the object was shown, may be output by Object Summarization 310. Results of Object Summarization 310 may be stored to Data Storage 104 via Saving to Data Repository 312.

In some embodiments, Python's dlib, imageai, and/or tensorflow packages, particularly Tensorflow Object Detection, are used in lieu of or in addition to OpenCV to achieve Visual Classification 308. New objects can be learned by models and subsequently scored on new audiovisual content via supervised learning.

Audio Data is received and/or retrieved 400 from Data Storage 104, as elucidated in FIG. 4. In some embodiments of the invention, the audio data is transformed and summarized by various functions, examples represented by 402, 404, 406, 408, 410, 412, and 414 in FIG. 4. While not shown in FIG. 4, transformations may include audio normalization, noise filtering, and windowing to improve results on subsequent transformations. Fourier Transform 402 applies an algorithm for Discrete Fourier Transformation (DFT) to the audio, resulting in the extraction of one or more spectral components. In one embodiment, a Fast Fourier Transform with a sampling rate of 48 kHz is applied using the Python numpy library fft method. In another embodiment, the Python librosa library stft method is used. Spectral Centroid Computation 404 may be performed to estimate the center of mass for extracted spectrums. These metrics are useful to quantify the "brightness" of the audio. In some embodiments, the Python librosa library spectral centroid method is used with a sample rate of 48 kHz. The output is an array of centroids, each element representing the centroid of the ith frame.

Spectral Rolloff Computation 406 computes the frequency below which 85% of the spectral energy exists. In some embodiments, the Python librosa library spectral rolloff method is used with a sample rate of 48 kHz. In alternative embodiments, a different roll percent, denoted by 85% above, may be used. The output is an array of roll off frequencies, each element representing the roll off frequency of the ith frame. Spectral Bandwidth Computation 408 computes the difference between the upper and lower frequencies for a spectrum. In some embodiments, the Python librosa library spectral bandwidth method is used to compute the first-order spectral bandwidth on a sample rate of 48 kHz. The output is an array of bandwidths, each element representing the bandwidth of the ith frame. Zero-Crossing Rate 410 is computed to augment classification of percussive sounds. In some embodiments, the Python librosa library zero crossing rate method is used. The output is an array of fractions of zero crossings, each element representing the fraction of zero crossings in the ith frame.

Mel-Frequency Cepstral Coefficients 412 are computed as a means of audio dimensionality reduction. In some embodiments of the invention, the Python librosa library mfcc method is used to compute 20 coefficients per frame using a sample rate of 48 kHz. Alternative embodiments adjust the parameters, including the number of coefficients to output. Alternative embodiments may use the Python python_speech_features library mfcc method, the scipy library dct method, or any other supporting library to compute Mel-Frequency Cepstral Coefficients 412. Chroma Feature Computation 414 computes the energy of each audio pitch class over time. Chroma Feature Computation 414 helps capture the harmonic and melodic attributes of audio. The output is a multidimensional array with 12 rows, each row representing 12 equal-tempered pitch classes with semitone spacing. Each column represents chroma features of the ith frame. In some embodiments of the invention, the Python librosa library chroma_stft method may be used with a sample rate of 48 kHz.

Speech-To-Text 418 converts detected speech within audio to a text representation of that speech. One or more speakers may be detected within the audio, with each speaker's speech being converted to text. In some embodiments, the Python SpeechRecognition library, including the Recognizer class, is used to convert speech to text. In some embodiments, APIs connecting to third-party speech recognition engines are used. Text Miner 420 applies transformations on the output from Speech-To-Text 418 to better structure the data for classification tasks conducted by Audio Classification 416. In some embodiments, the Python NLTK library is used to tokenize sentences and words, compute a Term-Document matrix (TDM), remove stopwords, and apply lexicon normalization, including stemming and lemmatization. Some embodiments use Python's Flair package and/or Python's Spacy package to perform similar NLP functions. Automatic Text Summarization may be performed. The result of Text Miner 420 is supplied to Audio Classification 416 where it may be used, in conjunction with other data provided to Audio Classification 416, to perform various classification tasks. As one example, Speaker Tones 416*e* as shown in FIG. 14 may use output from Text Miner 420 as part of its determination of speaker sentiment.

Figure 14:
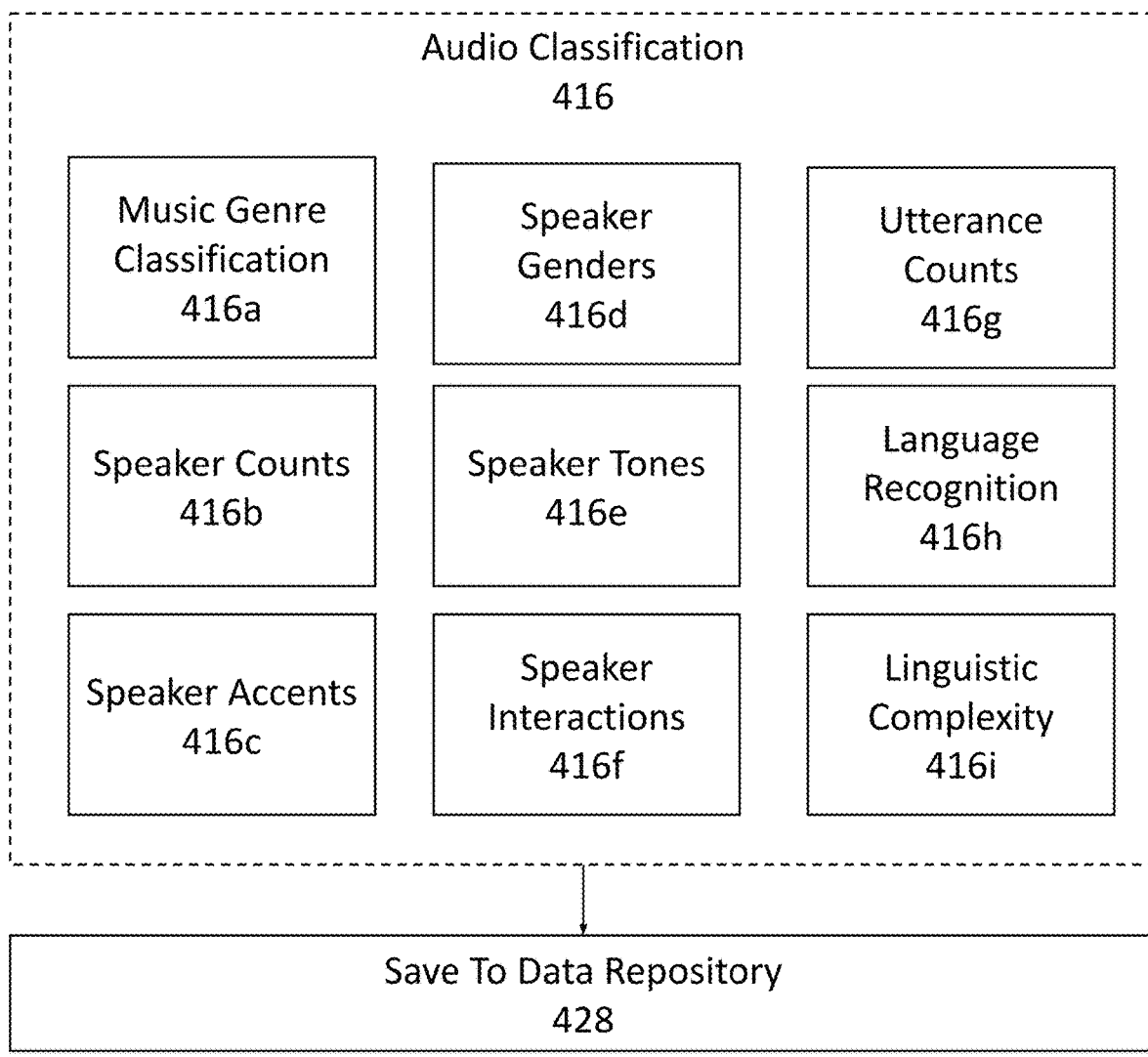
FIG. 14 depicts an expanded view of Audio Classification 416 shown on FIG. 4 and how auditory cognition is applied to classify audio data attributes according to various embodiments of the present invention.

As shown on FIG. 4, Audio Classification 416 may use any and all combinations of outputs from audio transformations, including but not limited to 402, 404, 406, 408, 410, 412, 414, 418, and 420 to both train models and score data for a variety of labels, examples which are depicted in FIG. 14. Save To Data Repository 428 stores data from Audio Data Processor 204 to Data Storage 104. Any and all outputs from audio transformations, including but not limited to output from 402, 404, 406, 408, 410, 412, 414, 418, and 420 may be stored to Data Storage 104. Any and all input, output, and intermediary data from Audio Classification 416, including fitted models, may be stored to Data Storage 104.

In FIG. 14, Audio Classification 416 applies any combination of supervised and unsupervised learning techniques to categorize, and in the case of supervised methods, label, audio for various attributes. Audio Classification 416 may be applied to any subset of audio. In some embodiments of the invention, Audio Classification 416 is performed on every 15-second windowing sample of audio, with the window shifting forward in 1-second increments. Results are aggregated to the level of the full audiovisual item using, for example, a max( ) and/or mean( ) function, as appropriate for the classification type. Some examples of audio classification models fit and/or scored using Audio Classification 416 include, but are not limited to, Music Genre 416*a*, Speaker Counts 416*b*, Speaker Accents 416*c*, Speaker Genders 416*d*, Speaker Tones 416*e*, Speaker Interactions 416*f*, Utterance Counts 416*g*, Language Recognition 416*h*, and Linguistic Complexity 416*i*. Music Genre 416*a* outputs the genre of background music used in the audio component of the audiovisual data. Speaker Counts 416*b* outputs the total number of speakers (unique voices) detected in the audio component of the audiovisual data.

Speaker Accents 416*c* outputs the accents of each speaker detected in the audio component of the audiovisual data. In contrast with Language Recognition 416*h* which detects the languages used by speakers, Speaker Accents 416*c* detects accents within a language. For example, Language Recognition 416*h* may detect that English is the language used by a speaker, but Speaker Accents 416*c* may detect that the same English speaker is using a French accent. Speaker Genders 416*d* predicts the gender of each speaker using voice(s) detected in the audio component of the audiovisual data. Speaker Tones 416*e* outputs the sentiment of the speakers. For example, do the speakers sound happy, sad, scared, etc. In some embodiments, Speaker Tones 416*e* uses Speech-To-Text 418 and subsequent Text Miner 420 to mine the text of speech spoken in the audio to help classify the speech sentiment. Speaker Interactions 416*f* outputs a determination of who each speaker in the audio is addressing when he/she speaks. For example, if there are two speakers in the audio, Speaker Interactions 416*f* may detect that each speaker is both talking to the other and to the audiovisual viewer.

Utterance Counts 416*g* counts the number of distinct utterances spoken by one or more speakers in the audio component of the audiovisual data. In some embodiments, an utterance is synonymous with one sentence. Language Recognition 416*h* outputs the language detected in the audio component of the audiovisual data. If more than one language is used in the audio, Language Recognition 416*h* may output the language used by each detected speaker. In some embodiments, the Python library langdetect may be used. Linguistic Complexity 416*i* outputs the lexical readability and/or richness of the verbiage used in the audio component of the audiovisual data. In some embodiments, Linguistic Complexity 416*i* may output a Flesch-Kincaid readability score, Flesch's reading ease score, and/or an Automated Readability Index. In some embodiments, the Python NLP library and/or the Python readability library may be used.

Save To Data Repository 428 stores data from Audio Classification 416 to Data Storage 104. Any and all input, output, and intermediary data from Audio Classification 416, including fitted models, may be stored to Data Storage 104. As one example of the end-to-end functioning of Audio Data Processor 204, the audio component from a single TV commercial is extracted by Attribute Recognition 108 and passed to Audio Data Processor 204. Among other transformations, Audio Data Processor 204 uses Speech-To-Text 418 for speech recognition, the output of which is passed to Text Miner 420. Text Miner 420 transforms the text into a summarized term-document matrix (TDM), the output of which is passed to Audio Classification 416. Audio Classification 416 receives summarized text data from Text Miner 420 and uses it for Language Recognition 416*h*. The resulting output, that the TV commercial is spoken in Spanish, is output to Data Storage 104.

As another example of the end-to-end functioning of Audio Data Processor 204, the audio component from a single digital video is extracted by Attribute Recognition 108 and passed to Audio Data Processor 204. Among other transformations, Audio Data Processor 204 performs Spectral Centroid Computation 404, Spectral Rolloff Computation 406, Spectral Bandwidth Computation 408, Zero-Crossing Rate 410, Mel-Frequency Cepstral Coefficients 412, and Chroma Feature Computation 414, the results of each transformation being stored to Data Storage 104. Next, a pretrained model for music genre classification may be imported by Music Genre Classification 416*a* from Data Storage 104. Using transformation outputs from 404, 406, 408, 410, 412, and 414 in conjunction with the pretrained model, Audio Classification 416 outputs a classification of the music genre for the digital video and stores this classification to Data Storage 104.

Pretrained models may be used for any classification task performed by Audio Classification 416. However, it may, at times, be necessary or desirable to train a model from scratch. As one example of how embodiments of the invention support training a model for use by Audio Classification 416, the publicly available GITZAN dataset is retrieved by Data Retrieval 106 and stored to Data Storage 104. Audio Data Processor 204 retrieves audio data 400 from Data Storage 104 representing the GITZAN dataset. Among other transformations, Audio Data Processor 204 performs Spectral Centroid Computation 404, Spectral Rolloff Computation 406, Spectral Bandwidth Computation 408, Zero-Crossing Rate 410, Mel-Frequency Cepstral Coefficients 412, and Chroma Feature Computation 414, the results of each transformation being stored to Data Storage 104. Audio Classification 416 may transform the data from any or all of 404, 406, 408, 410, 412, and 414, including rescaling features. The data is then partitioned into training and test sets, with each observational unit representing one audio clip. Using the Python keras library, a convolutional neural network is trained and validated on the data. The resulting trained model is stored to Data Storage 104 and may be used by Music Genre Classification 416*a* in a fashion similar to how pretrained models are used.

According to FIG. 5, Metadata Processor 206 operates on text, numeric, and other ancillary data associated with audiovisual content, examples of which include a video's title and publication date. The first step taken by Metadata Processor 206 in embodiments of the invention is to Receive Metadata 500, including but not limited to retrieving metadata from Data Storage 104. Examples of Metadata 502 include but are not limited to Duration 502*a* (the amount of time that the audiovisual runs), description 502*b* (text and/or audio that often accompanies an audiovisual to either describe it and/or summarize it), Title 502*c* (the text-based title of the audiovisual), Creator 502*d* (the name of the person and/or company that produced and/or released the audiovisual), Publication Date 502*e* (the date and/or timestamp for when the audiovisual was published), Recording Date 502*f* (the date and/or timestamp for when the audiovisual was built, made, and/or rendered), Subtitles and Closed Captions 502*g*, including auto-generated subtitles, HTML tags and HTML metadata 502*h*, including but not limited to keywords associated with the content and information about video test variation being viewed when using an AB or other form of split testing tool, Comments 502*i* and other user-generated content created by viewers of the audiovisual content, Views & Impressions 502*j*, such as view counts generated by watching online videos and/or impression counts when TV ads are aired, Watch Times 502*k* (how long viewers watched the video content), and Postlogs 502*l*, including all TV airing data such as airing timestamps, network, channel, and other attributes about the TV airing.

Components of Metadata 502 may be mined using Text Mining 504. Text Mining 504 has similar properties to Text Miner 420, except that it operates on Metadata 502 rather than Audio Data 400. Text Mining 504 applies transformations on Metadata 502 to better structure the data for classification tasks conducted by Pattern Recognition 114. In some embodiments, the Python NLTK library is used to tokenize sentences and words, compute a Term-Document matrix (TDM), remove stopwords, and apply lexicon normalization, including stemming and lemmatization. Automatic Text Summarization may be performed. Examples of tasks performed by Text Mining 504 include but are not limited to Topic Classification 504*a* (a short phrase, often a word or two long, that summarizes the audiovisual), and Sentiment Analysis 504*b* (natural language processing to assess if text is positive, negative, or neutral). In some embodiments of the invention, Topic Classification 504*a* is performed using the Python spaCy and scikit-learn libraries. The python Flair library may be used in addition to or as an alternative to the Python spaCy library. One or more trained spaCy language models, such as "en_core_web_sm" and/or "en", may be used. Among other transformations, text may be tokenized, lowercased, and stopwords removed. Lemmatization and Part of Speech tagging may be applied. One or more term-document matrices may be constructed. Data may be partitioned into a training, validation, and/or test set. A supervised and/or unsupervised learning algorithm may be applied. In the case of a supervised learning algorithm, the training data may use labels that were already associated with the text and/or labels may be manually constructed by a human or machine.

Natural Language Processing (NLP) techniques to extract additional structured data from the Received Metadata 500 may be employed by Text Mining 504. In one embodiment, Python Flair library is used by the invention; Received Metadata 500, including but not limited to Title 502c and Description 502b, are made into Flair sentence objects. Sentence objects undergo Sequence Tagging, after which tagged sequences are scored using an English-language NER model trained on the Conll-03 dataset. Detected entities, including but not limited to people, locations, and organizations, are then Saved to Repository 506 and may be used as attributes in Pattern Recognition 114.

Crowdsourcing may be used to construct labels for any training and test sets, with one or models fitted on the human-labeled data such that the fitted model may be used to score new data without human involvement.

The result of Text Mining 504 and Metadata 500 are stored to Data Storage 104 via Save To Data Repository 506. The result of Text Mining 504 and Metadata 500 may be used by Pattern Recognition 114, in conjunction with other data provided to Pattern Recognition 114, to perform various regression and/or classification tasks. Some of the data processed by Metadata Processor 206 may be similar to intermediate data and/or outputs from Visual Data Processor 202 and/or Audio Data Processor 204. For example, Metadata Processor 206 may process data that labels the audiovisual content as being spoken in English. As one of the computations performed by Audio Data Processor 204, Language Recognition 416h operated by Audio Classification 416 should be expected to output English as the detected language. Cases where there is a mismatch between outputs of Metadata Processor 206, Visual Data Processor 202, and/or Audio Classification 416 may be flagged for various end users and/or used to correct the raw data received by embodiments of the invention.

Figure 20:
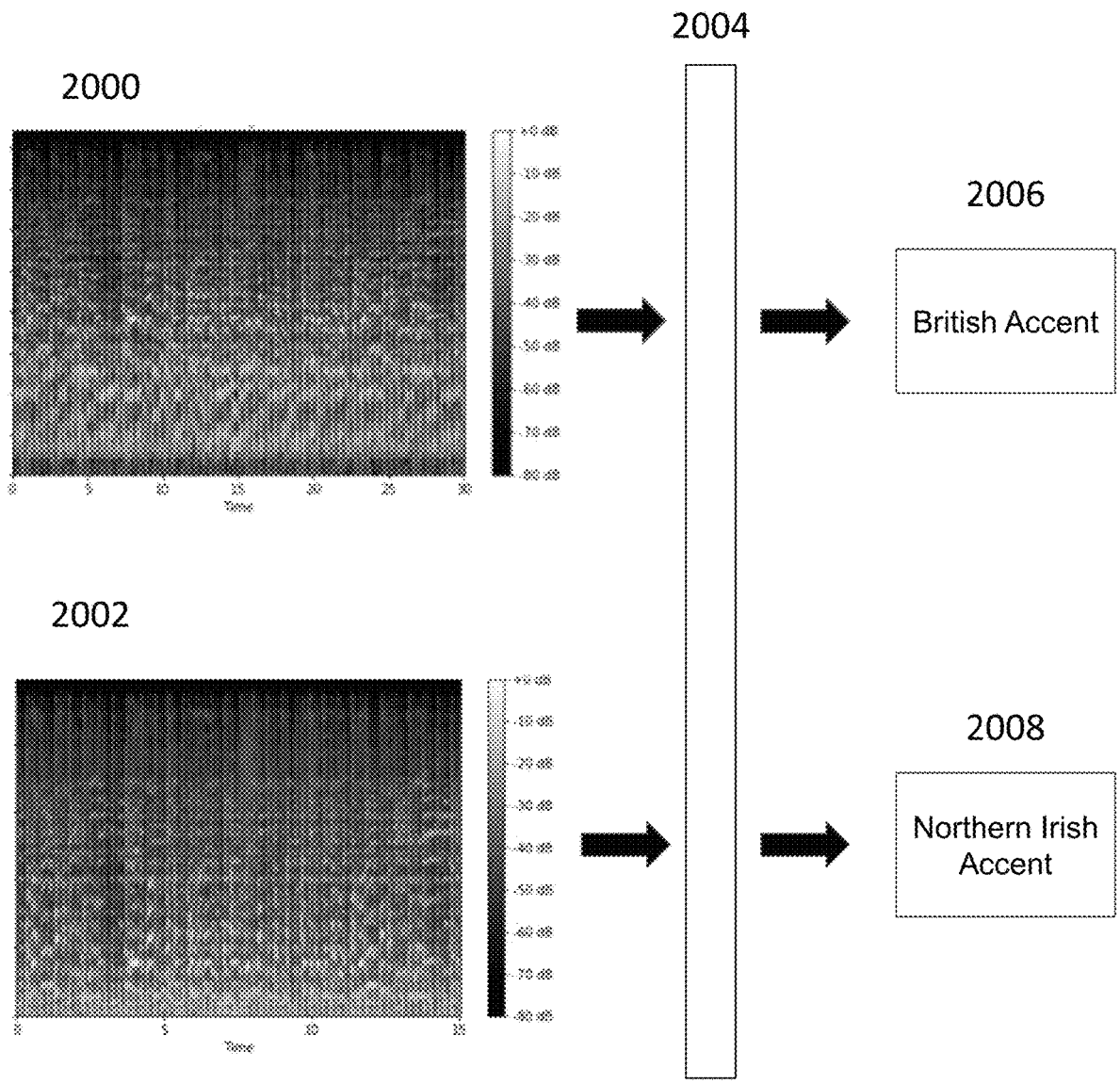
FIG. 20 depicts an example visual representation of Attribute Recognition 108 using Audio Data Processor 202 to extract attributes for use with Pattern Recognition 114 according to various embodiments of the present invention.
Figure 21:
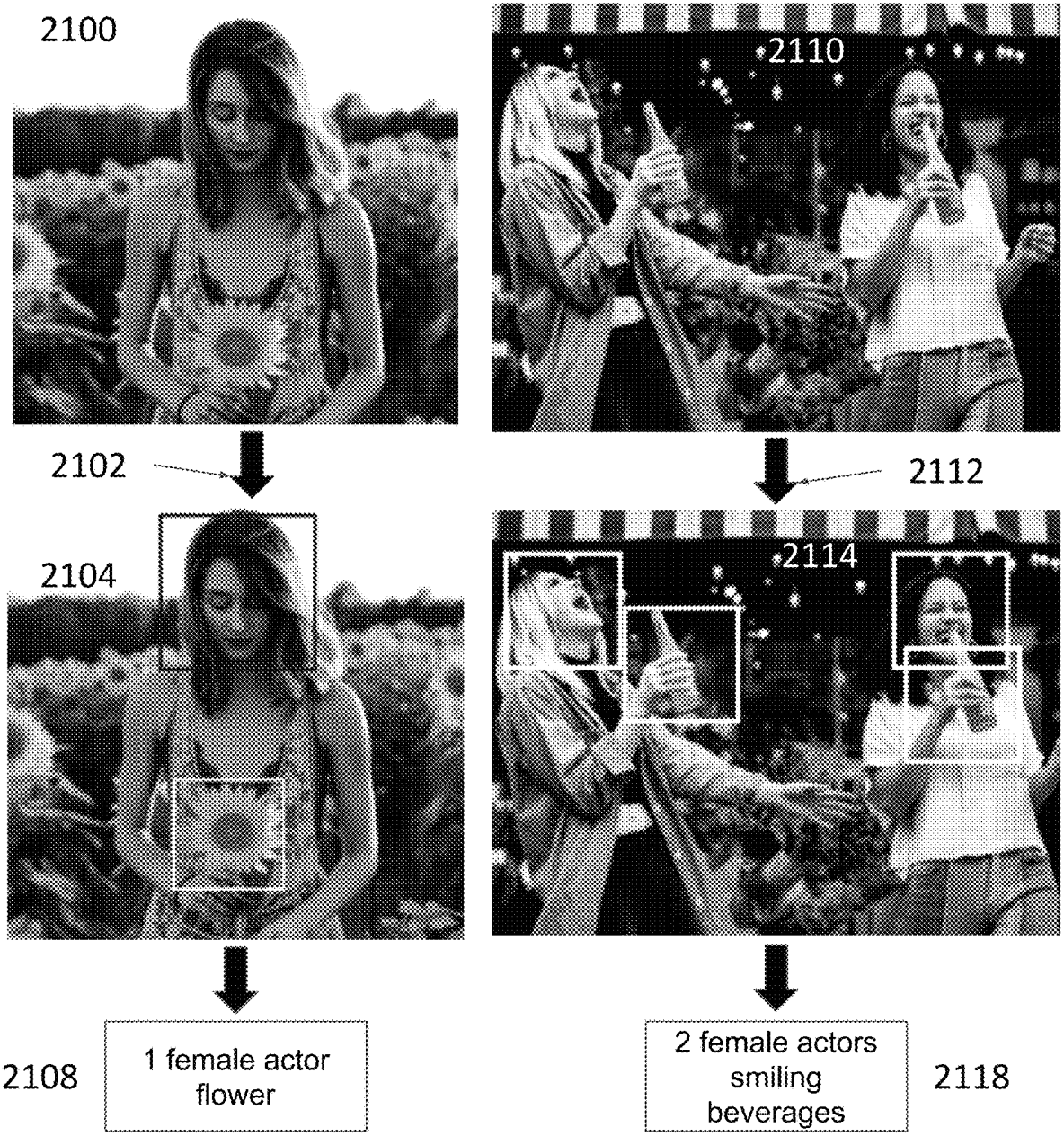
FIG. 21 depicts an example visual representation of Attribute Recognition 108 using Visual Data Processor 204 to extract attributes for use with Pattern Recognition 114 according to various embodiments of the present invention.

The inputs into Pattern Recognition 114 are further elucidated in FIGS. 20, 21, and 22. FIG. 20 shows an example of Attribute Recognition 108 using Audio Data Processor 204, the output which provides one or more features to Pattern Recognition 114. FIG. 21 shows an example of Attribute Recognition 108 using Visual Data Processor 202, the output which provides one or more features to Pattern Recognition 114. FIG. 22 shows a visual depiction of an example of Pattern Recognition 114 processing outputs from Audio Data Processor 204, Visual Data Processor 202, and Effectiveness Measurement 110 to arrive at one example of Output Generation 116.

Referring to FIG. 4 and FIG. 20, Received Audio Data 400 by Audio Data Processor 202 is processed to extract numeric representations from Received Audio Data 400, the output for use as a plurality of input features into Audio Classification 416. Mel Spectrograms 2000 and 2002 on FIG. 20 are graphical representations of output from Mel-Frequency Cepstral Coefficients 412. These data, along with other data that may include but are not limited to Spectral Rolloff 406, Spectral Bandwidth 408, Zero-Crossing Rate 410, and/or Chroma Feature 414, are used as inputs into Audio Classification 416, said Audio Classification represented by 2004 on FIG. 20.

In some embodiments, Audio Classification 416, also represented by 2004 on FIG. 20, scores new Received Audio Data 400 via use of one or more machine learning models, the results of which are one or more labels of elements detected within said Received Audio Data 400, some examples which include but are not limited to the voice of a female and male, a British accent for the female and an Irish accent for the male, laughing, recognition of words and/or phrases, and the sound of a carbonated soda can being opened. In some embodiments, the machine learning model used for Audio Classification 416 is a trained, supervised learning model built using Tensorflow, with features developed with the assistance of Librosa. Pre-trained models, such as Python's SpeechRecognition library may be used, but any arbitrary, novel classification can be trained by constructing a training set of audio that are human-labeled, including with the assistance of crowdsourcing or using pre-labeled datasets.

In the case of the example shown in FIG. 20, Received Audio Data 400, from which the invention computed Mel Spectrogram 2000, is scored by Audio Classification 2004, the resulting output label indicating a vocal sound with British Accent 2006. In contrast, Received Audio Data 400, from which the invention computed Mel Spectrogram 2002, is scored by Audio Classification 2004, the resulting output label indicating a vocal sound with Northern Irish Accent 2008. In some embodiments, these data may be Saved To Data Repository 428 and joined with performance metrics by Effectiveness Measurement 110 as well as additional features gathered from the output of Attribute Recognition 108 through the action of Pattern Recognition 114.

Figure 23:
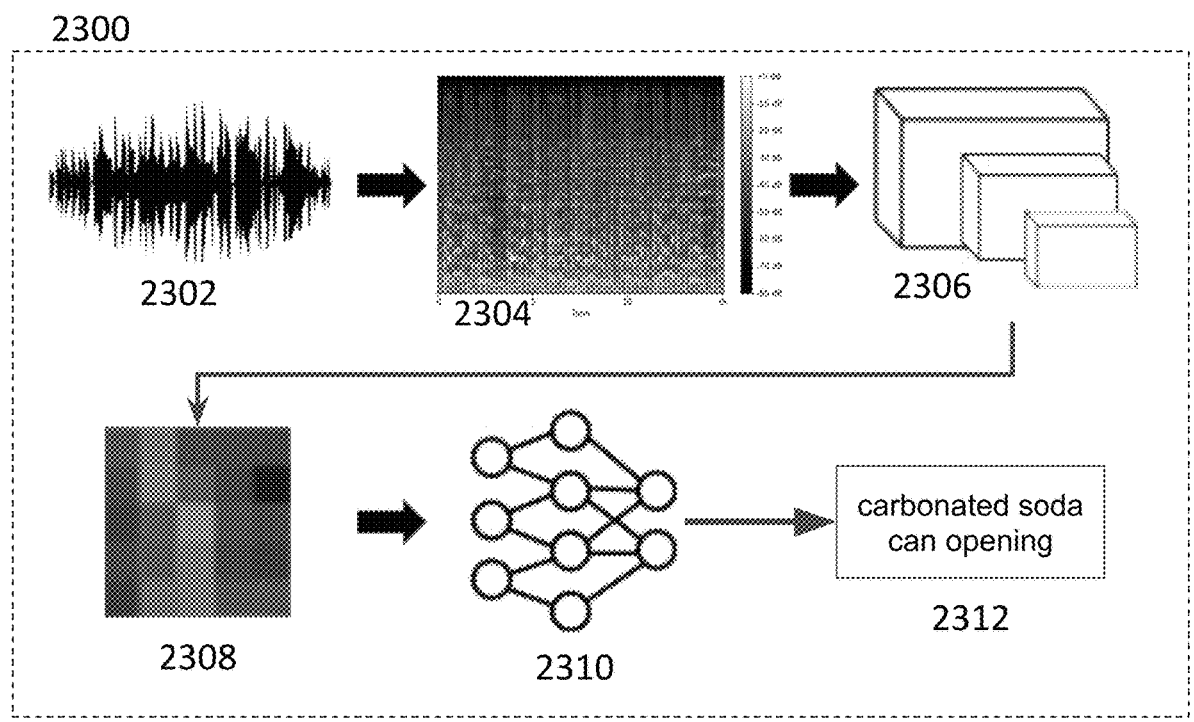
FIG. 23 depicts an example visual representation of training machine learning models for use by Audio Classification 416 according to various embodiments of the present invention.

An example of the process used to train new Audio Classification 416 models to label any arbitrary sound and represent such labels in text and/or numeric representation is shown in FIG. 23. Received Audio Data 400 is transformed into alternative digital representations of said Received Audio Data 400, one example visually shown as Spectrogram 2302. Additional transformations of the data are performed, as shown in FIG. 4, with one result being visually represented by Mel Spectrogram 2304. In some embodiments, Tensorflow is used to perform a series of convolutional operations with ReLU and poolings, yielding one or more Feature Maps 2306, an example of one such Feature Map visually shown as 2308. Resulting feature maps pass through a Flatten Layer 2310, the result of which is a one-dimensional output layer. In the example shown in FIG. 23, the Label 2312 used to train model 2300 is "carbonated soda can opening."

Referring to FIG. 3 and FIG. 21, Received Visual Data 300 by Visual Data Processor 202 is processed to extract numeric representations from Received Visual Data 300, the output for use as a plurality of input features into Visual Classification 308. As one example, Received Visual Data 300, represented by video 2100 in FIG. 21, undergoes transformation to numeric representations of said video. Visual Classification 308, also represented by 2102 on FIG. 21, scores new Received Visual Data 300 via use of one or more machine learning models, the results of which are one or more labels of elements detected within said Received Visual Data 300, some examples which include but are not limited to a female actor's face and a flower, as shown in Detections 2104 and Labels 2108. Similarly, Received Visual Data 300 as depicted by video 2110 is scored via Visual Classification 308 represented by 2112 in FIG. 21, the output of Visual Classification 308 labeling two female actors, smiling, and two beverages as visually shown in Detections 2114 and Labels 2118. In some embodiments, the machine learning model used for Visual Classification 308 is a trained, supervised learning model built using Tensorflow, with features developed with the assistance of OpenCV and Pillow. Pre-trained models, such as Python's face-recognition library may be used, but any arbitrary, novel classification can be trained by constructing a training set of videos that are human-labeled, including with the assistance of crowdsourcing or using pre-labeled datasets.

In some embodiments, these data may be Saved To Data Repository 312 and joined with performance metrics by Effectiveness Measurement 110 as well as additional features gathered from the output of Attribute Recognition 108 through the action of Pattern Recognition 114.

Figure 24:
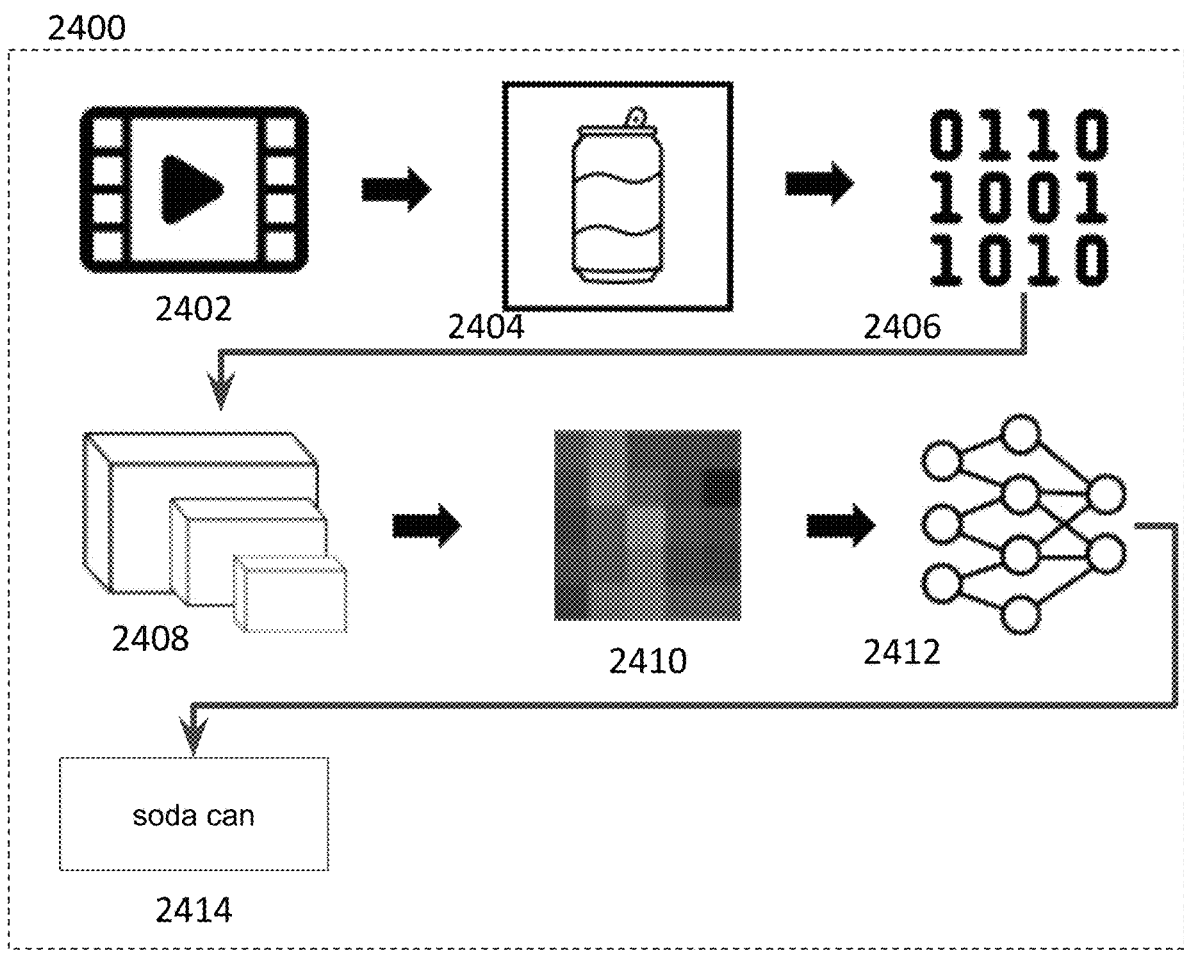
FIG. 24 depicts an example visual representation of training machine learning models for use by Visual Classification 308 according to various embodiments of the present invention.

An example of the process used to train new Visual Classification 308 models to label any arbitrary object and/or action and represent such labels in text and/or numeric representation is shown in FIG. 24. Received Visual Data 300, visually shown in FIG. 24 as video 2402, is transformed into alternative digital representations of said Received Visual Data 300, one example visually shown as Frame 2404. Additional transformations of the data are performed, as shown in FIG. 24, with one result being visually represented by Numeric Representation 2406. In some embodiments, Tensorflow is used to perform a series of convolutional operations with ReLU and poolings, yielding one or more Feature Maps 2408, an example of one such Feature Map visually shown as 2410. Resulting feature maps pass through a Flatten Layer 2412, the result of which is a one-dimensional output layer. In the example shown in FIG. 24, the Label 2414 used to train model 2400 is a "soda can."

It should be noted that data from multiple frames, one such frame represented by Frame 2404 in FIG. 24, may be used to validate findings from other frames and all other attributes output by Attribute Recognition 108. Results input into Pattern Recognition 114 may be weighted by the extent of corroboration that a label is valid. For example, if a female actor is detected by Visual Data Processor 202, but the invention finds no female voice as an output of Audio Data Processor 204, the detection of a female actor may be down-weighted, including set to zero. As another example, if one female actor is found in 99.5% of frames for a video and 0.5% of frames has labels for two female actors, the invention may input one female actor into Pattern Recognition 114.

Through the methods disclosed above for Visual Data Processor 202, the following is a non-exhaustive list of attributes the invention extracts and uses in subsequent steps shown in FIG. 1, including Pattern Recognition 114 that joins labels output by Effectiveness Measurement 110 alongside features output by Visual Data Processor 202.
- a. human characteristics applied to non-humans (i.e. Taco Bell talking chihuahua, 1985 Pepsi Transformers TV commercial)
- b. number of unique actors in ad
- c. qualities of objects in contact with characters, including clothing and electronic devices being held
- d. types of clothing worn by actors in ad (black suit, blue bowtie, red bikini, yellow shawl)
- e. state of dress and/or undress of actors in ad
- f. eye contact of actors
- g. ratio of screen time comprised of faces (close-up talking to camera vs. humans in a distance)
- h. setting (indoors/outdoors, in the woods, in the mountains, inside a car, on a boat)
- i. facial expressions and emotional expressions of actor(s)
- j. facial features
- k. actor(s) positioning on screen (close-up of face, actor driving in car, etc)
- l. gender of actor(s)
- m. lighting (bright, dark, etc)
- n. magnitude and qualities of movement (of people, cars, etc)
- o. sign language detection and recognition
- p. frame rate
- q. animal detection
- r. robot detection
- s. food and beverage detection
- t. food and beverage textures and colors
- u. cartoon (animation) detection and attributes
- v. real-life detection (in contrast to animation)
- w. vehicle detection
- x. vehicle motion
- y. vehicle color and style (i.e. red sedan, blue motorcycle, yellow sailboat)
- z. robot and cyborg detection
- aa. logo detection, logo attributes, and logo placement on screen
- bb. banner detection and banner attributes on screen (i.e. news ticker motion and color, banner with brand phone number)
- cc. url detection, recognition, and on-screen placement
- dd. phone number detection, recognition, and on-screen placement
- ee. QR code and other identifying code detection, recognition, and on-screen placement, including motion
- ff. interrupt screens (i.e. abrupt color change, blackouts)

Through the methods disclosed above for Audio Data Processor 204, the following is a non-exhaustive list of attributes the invention extracts and uses in subsequent steps shown in FIG. 1, including Pattern Recognition 114 that joins labels output by Effectiveness Measurement 110 alongside features output by Audio Data Processor 204.
- a. food and beverage-associated sounds (i.e., crunch, gulp, 'psssch' when opening soda can)
- b. jingle detection, attribute recognition (i.e. tone, mood, language), and placement in video
- c. bodily sounds (i.e. cough, sneeze)
- d. speech recognition of voiceover
- e. sentiment of recognized speech
- l. number of unique actors based on voice recognition
- g. language
- h. actor(s) accents
- i. gender of actor(s)
- j. presence and qualities of background music (i.e. volume, valence, tempo, mood)
- k. sarcasm (based on sentiment detection from text and at least one of either speech intonation or facial expression at time of utterance)
- l. silence detection (esp. atypical periods of silence)
- m. volume modulation Through the methods disclosed above for Metadata Processor 206, the following is a non-exhaustive list of attributes the invention extracts and uses in subsequent steps shown in FIG. 1, including Pattern Recognition 114 that joins labels output by Effectiveness Measurement 110 alongside features output by Metadata Processor 206.
- a. title, duration, description
- b. language
- c. text mining of closed captioning
- d. readability, sentiment, keywords
- e. theme
- f. plot and plot summarization
- g. text summarization
- h. TV network of airing
- i. time of airing
- j. time of publication
- k. time of creation l. author
m. brand
n. media channel and subchannel of airing (i.e. YouTube on the Discovery Channel)
o. number of views
p. number of clicks
q. number of impressions
r. watch time Effectiveness Measurement 110 Further Explained in FIG. 6

As disclosed herein, a major utility and novelty of this invention is its ability to learn from competitors' marketing spend. This enables users of the invention to avoid the high testing costs and high upfront costs associated with video marketing. Further, the more a competitor spends, the greater the strategic advantage the invention yields to users of the invention. This section includes a non-exhaustive description of the methods the invention uses to learn from competitors' spending.

Figure 6:
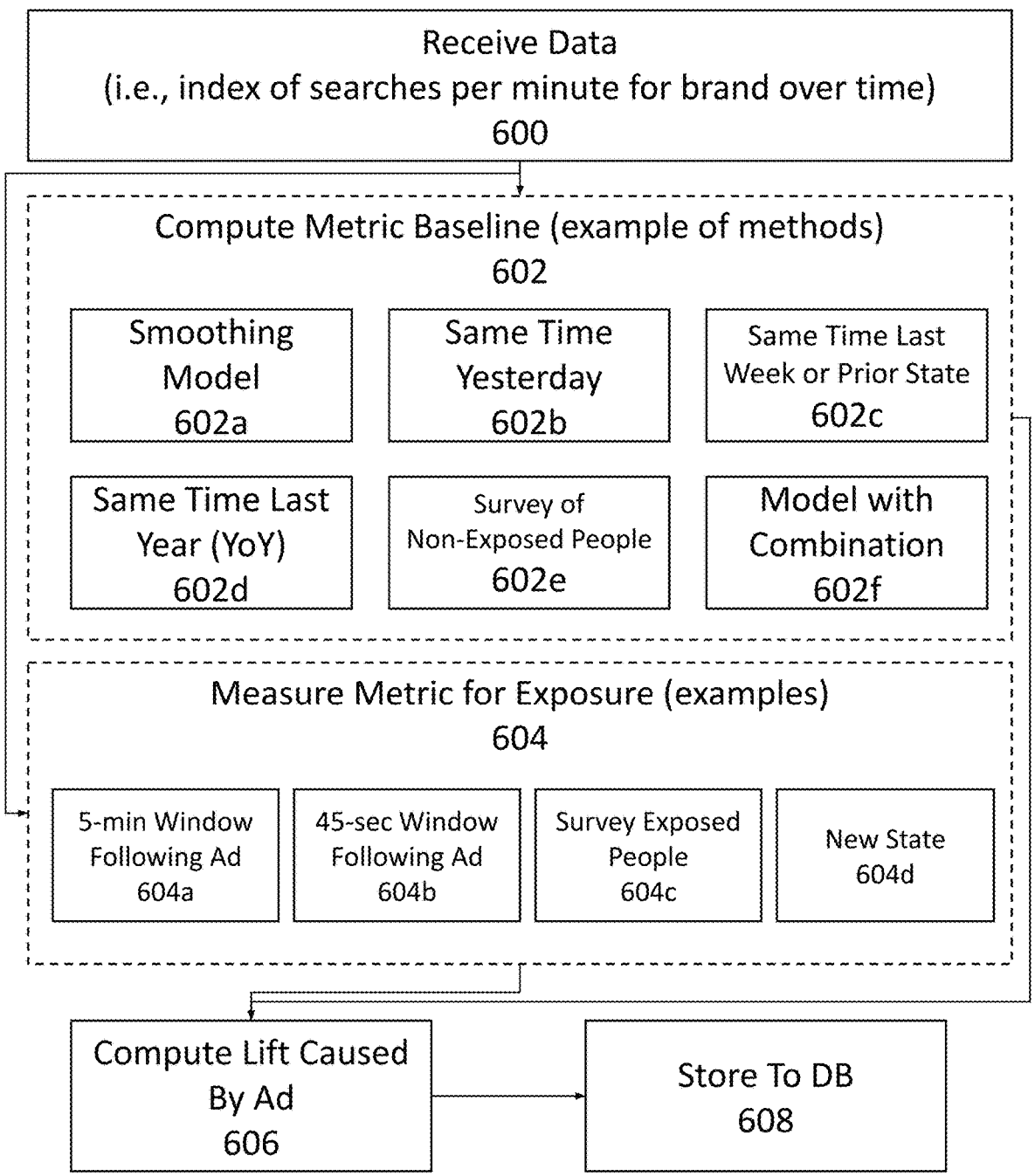
FIG. 6 shows an expanded view of Effectiveness Measurement 110 first shown on FIG. 1 and how the performance effects of videos are quantified and processed according to various embodiments of the present invention.

In some embodiments of the invention according to FIG. 6, Received Data 600 is used to compute one or more performance metrics associated with one or more videos. While certain key metrics, like revenue or profits generated by the video for the sponsoring brand, may not be directly measurable, the embodiments of the invention can compute "proxy metrics" that strongly correlate with desired performance metrics, allowing for materially similar recommendations to be output by the invention as if it were operating directly on the desired metric.

In some embodiments, Automatic Content Recognition (ACR) data is Received Data 600. By joining this data to Received Data 600 that includes a catalog of known TV airtimes and video creative, the invention quantifies user signals associated with the video ad, including watch times and channel changing behavior.

In some embodiments, website pixel, javascript, and/or other website tracking data that labels observational unit exposure status to one or more audiovisual stimuli is Received Data 600.

Detecting Signals from View Counts

In some embodiments of the invention, online video views over time are used to infer video performance, as shown in FIG. 16. Patterns observed in views over time can be used to infer information about search engine recommendations, which in turn are a proxy variable for other performance metrics about a video, including but not limited to watch time and monetization. By joining these inferred performance data to the mined attributes associated with each video, the invention mines the relationships between cause and effect, thus enabling the invention to output recommendations and/or predictions regarding video attributes likely to perform better than others.

As a simple example shown in FIG. 16, an online video channel 1600 published three (3) videos at the exact same time, 1602, 1604, and 1606. Video 1602 has 1 actor talking about cars with calm background music, Video 1604 has 2 actors talking about planes with happy background music, and Video 1606 has 1 actor talking about cars with energetic background music. After six (6) months, Video 1602 has 100K views, Video 1604 has 5K views, and Video 1606 has 10K views. Relative to a simple baseline of mean views across these 3 videos at 6 months, Video 1602 scores 2.6, Video 1604 scores 0.13, and Video 1606 scores 0.26; the invention finds that Video 1602 with 1 actor talking about cars with calm background music outperforms. A competing brand channel 1608 produces and publishes three (3) videos; Video 1610 has 1 actor talking about planes with calm background music, Video 1612 has 1 actor talking about planes with happy background music, and Video 1614 has 2 actors talking about cars with calm background music. After six (6) months on this competing brand's channel, Video 1610 has 160K views, Video 1612 has 180K views, and Video 1614 has 500K views. Relative to a simple baseline of mean views across these 3 videos at 6 months, Video 1610 scores 0.57, Video 1612 scores 0.64, and Video 1614 scores 1.79. By comparing relative video scores across videos within each brand channel 1600 and 1608, the invention calculates, via Pattern Recognition 108 as elucidated in FIG. 8, that videos about cars that use calm background music, as embodied by videos 1602 and 1614, perform best. That is, relative to their respective brand channel baselines, they consistently performed better than expected and had the common elements of a car theme and calm background music. The invention determines that no significant difference in performance is observed by using one or two actors since no consistent pattern could be identified that reveals that actor count is related to performance outcome. Based on this simple example, the embodiments of the invention would output that videos concerning cars with calm background music are recommended over videos about planes and videos with happy or energetic music. In some embodiments, this result is displayed to a human user via Web Portal 118.

Note that use of absolute views and a baseline computed as an average of views for a baseline as described above is a simplification for illustrative purposes. While this may be accurate if all videos are published at the exact same time, this scenario rarely is encountered in commercial settings. In practice, Time Normalization 112 as shown in FIG. 7 is needed to adjust view and/or other performance metrics for varying time since publication of each video.

Detecting Signals from Changes a Competitor Makes to Videos Over Time

Changes that a competitor makes to their advertising over time says a lot about what they are observing—specifically, what works and doesn't work from the competitors' perspective. For example, ad spend changes are interpreted by some embodiments of the invention as a vote by the sponsoring brand for which ads and associated attributes it believes performs better or worse. Disclosed are methods for embodiments of the invention to extract, structure, and use this information in accordance with FIG. 1.

In FIG. 17, an example of how the invention infers performance signals from some competitor changes is shown. The performance signals contained in this example are extracted via the mechanism disclosed in Effectiveness Measurement 110. The invention detects that a brand published three video ads—1702, 1704, and 1706—to an online channel. The invention detects that these pieces of content are likely part of a controlled experiment and associates them due, in part, to their close proximity of publication and similar ad spend levels 1702a, 1704a, 1706a; the invention labels them as part of a State 1700. A new state is created by the invention whenever a brand changes their video marketing in some way, such as adding or removing a creative, changing channels, or changing spend levels. It should be noted that the close proximity of publication and similar spends, in particular, are hallmarks that the competitor may wish to compare these ads in some way, perhaps as a controlled experiment such as an AB test or multi-armed bandit. Some additional corroborating indicators of a controlled experiment include the videos having similar locations of airing, audiences, and any other attributes that indicate that the sponsoring brand is attempting to keep "all else equal" between the various pieces of content so that they can be fairly compared in a controlled way. A controlled experiment is not needed for the invention to detect and extract performance signals, but such detected control helps to reduce uncertainty, for example, by making Time Normalization 112 less important for comparing creatives in the same state.

Three months later, the invention detects a change to video ad spends for the three original videos. The invention marks this as a new State 1708. Data from prior State 1700 informs Baseline 602, specifically a Prior State 602c baseline as shown in FIG. 6. The spend on Video ad 1702 decreased to $10K (1702b) while spend on Video ad 1706 increased to $500K (1706b). The spend on Video ad 1704 remained unchanged between states. In accordance with Effectiveness Measurement 110 shown in FIG. 6, using a simple ratio of ad spend/mean (ad spend per ad), New State 604d for Video Ad 1702 is 0.05 (~5% of avg ad spend is being spent on Video Ad 1702) while Baseline 602 from Prior State 602c was 1.00. Based on these state changes, the invention computes a Lift Caused By Ad 606 of 0.05-1.00=-0.95. This value is associated with the video creative on which it is measured and Stored to DB 608. A similar calculation is applied to the other videos ads 1704 and 1706. For Video Ad 1706, Baseline 602 from Prior State 602c was 1.00. New State 604d for Video Ad 1706 is 500K/203K=2.5. The invention computes a Lift Caused By Ad 606 of 2.5-1=1.5 for Video Ad 1706. This value is associated with the video creative on which it is measured and Stored to DB 608.

The sponsoring brand, through their video ad changes between states, is essentially voting for what it believes is most effective. The invention interprets these detected lifts caused by the brand changes as inferred performance signals. Specifically, Video Ad 1706 is inferred as"best", Video Ad 1702 is"worst", and Video Ad 1704 falls somewhere in between.

While the lifts are associated with the entire video creative unit, through the mechanisms of the Attribute Recognition 108 and Pattern Recognition 114, the lifts are partially associated with the attributes of each respective video creative. For example, the three distinctive attributes in Video Ad 1702 of 2 actors, about planes, and happy music are partially associated with the –0.95 Lift Caused By Ad 606; the Lift Caused By Ad 606 serving as a "label" or "Y-variable," or "dependent variable" as part of Pattern Recognition 114. A similar process is applied for Video Ads 1704 and 1706. As a consequence of the action of Attribute Recognition 108 and Pattern Recognition 114, it is inferred that a video ad containing 1 actor, related to cars, and/or with energetic music works best. The exact magnitude that each of these three attributes is more important than the other is solved for through the disclosed mechanism of Pattern Recognition 114.

Several months later, the invention detects another state change and labels it as State 1716. This time, the sponsoring brand dropped Video Ad 1702, decreased the spend of Video Ad 1704 to $5K (1704c) and increased the spend on Video Ad 1706 to $700K (1706c). Similar to the process applied for State 1708, Lift Caused By Ad 606 for each Video Ad 1706 is computed, resulting in the invention outputting that, in State 1716, Video Ad 1706 is most effective. Via the method disclosed for Pattern Recognition 108, the effectiveness of each video ad is distributed to its constituent attributes. In this case, the invention outputs that 1 actor in a video ad about cars with energetic music works best.

Since performance signals quantified by Effectiveness Measurement 110 are partially associated with attributes of the audiovisual content through the methods disclosed in Attribute Recognition 108 and Pattern Recognition 114, identical audiovisual content need not persist between states (i.e. State 1700, State 1708, and State 1716) in order for the invention to make inferences about the performance of attributes. FIG. 18. gives an example of a case that is more gray, where two states—State 1800 and State 1808, share no common audiovisual content. Embodiments of the invention work similarly in FIG. 18 as explained for FIG. 17.

Referring to FIG. 18, in State 1800, a brand sponsor is detected to have three unique videos—Video 1802 with 1 actor discussing planes, Video 1804 with 2 actors discussing planes, and Video 1806 with 1 actor discussing cars. Months later, new State 1808 is detected with a single Video 1810 containing 2 actors discussing cars. Similar computations occur on the videos in FIG. 18 as demonstrated on FIG. 17. Through the disclosed mechanism of Pattern Recognition 114, the invention recognizes similar attributes between videos of prior states. For example, while Video 1810 uniquely has the attributes of 2 actors discussing cars, we see that prior state Video 1804 shared a common attribute of 2 actors. Likewise, prior state Video 1806 shared a common attribute of cars. It can therefore be inferred that in State 1, if one could see exactly what the brand sponsor saw related to video performance, it's likely that Video 1804 and Video 1806 performed better than Video 1802. While the competitor performance data may be trade secret and unavailable to the public, the invention infers from the video that the sponsoring brand ran in subsequent states that attributes the later state videos have in common with prior state videos are likely to perform better than those attributes that were dropped or had a reduction in lift during later states.

Figure 11:
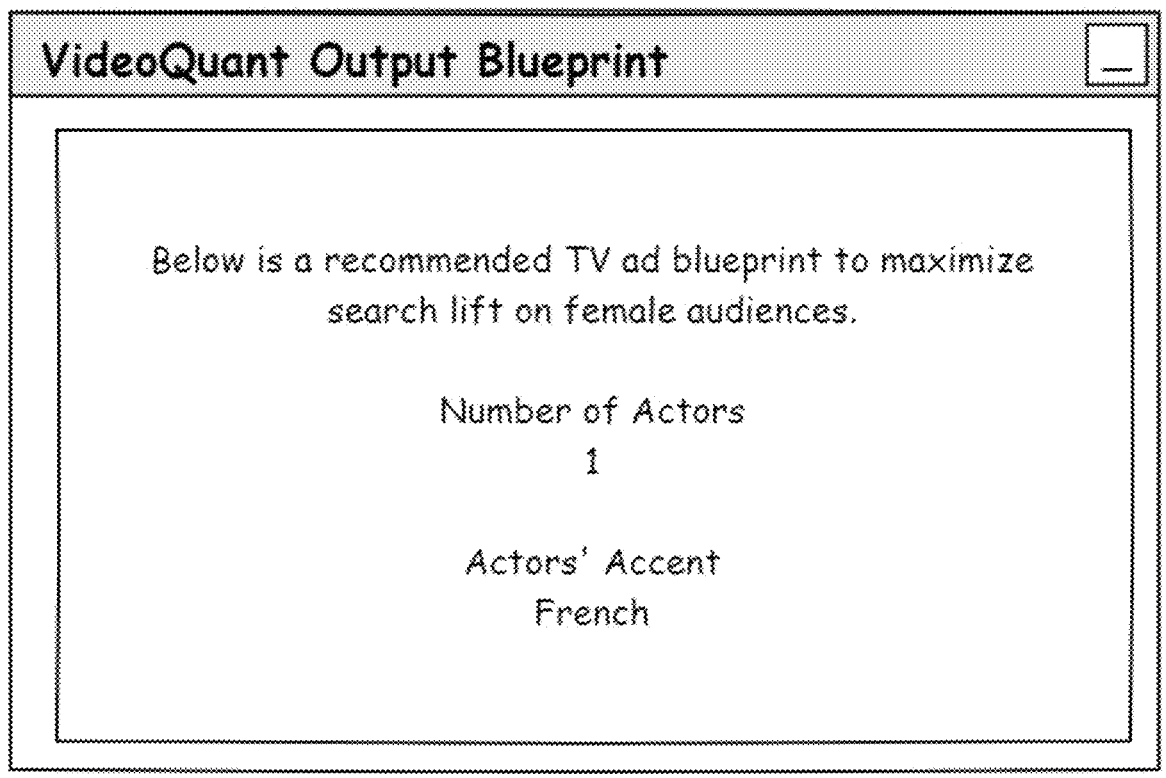
FIG. 11 depicts a visual display of output provided to a human user through Web Portal 118 according to various embodiments of the present invention.

The examples illustrated in FIG. 17 and FIG. 18 are typically not applied to just one brands' videos in practice. Rather, embodiments of the invention are run over hundreds or even thousands of brands spanning many years of time, yielding analysis of millions of videos for a single user of the invention and concise distillation of insights from these millions of videos, an example of which is shown in FIG. 11. This large-scale analysis of data often yields consistent and persistent performance signals associated with the same attributes and across brands.

When embodiments of the invention are used to infer performance signals from a brands' video changes over time, knowing something about who is running the brands' video campaigns is often helpful in practice. For example, the changes made by a junior team lacking data science resources are often less informative and predictive than those made by a seasoned team of quant and marketing professionals. This a-priori knowledge about the teams' whose videos are being analyzed by the invention can, in some embodiments, be used to weight the value of the performance signals detected from their observed behavior. FIG. 19. is a figure that demonstrates how this works in some embodiments.

In FIG. 19, there are two brands whose videos are being analyzed by the invention—Brand 1900 and Brand 1908. The video marketing team 1902 for brand 1900 is made up of top, highly-respected industry professionals that include a Ph.D. Statistician, a Sr. Quant with 12 years of industry experience, and an award-winning videographer. Detected States 1904, derived from marketing changes made by team 1902, are processed similar to the examples described in FIG. 17 and FIG. 18. Since team 1902 is considered competent in the field of A/B testing of video, a weight representative of the trustworthiness of the signal may be applied to any performance signals derived from the team and associated brand 1900. In this case, since the team is deemed highly qualified to perform video testing, a value of 1 is assigned for the weight 1906.

In contrast with brand 1900, brand 1908 has a more junior video marketing team 1910 composed of a Marketing Manager with 3 years experience, a junior Statistician, and a Marketing Intern. Team 1910 isn't well known in the industry and doesn't have a history of success like team 1902. For this reason, performance signals measured across States 1912, the states a result of changes made by Team 1910, are assigned a weight 1914 of 0.1, indicating that they may be less credible and should have less bearing on the results output by the invention.

Credibility weights like Weight 1906 and Weight 1914 may be stored to the database and used as model weights in Pattern Recognition 114. During Model Fitting 808, which may include any deep learning, machine learning, artificial intelligence, and/or statistical model, many such fitting methods allow for a weighting to be applied per observation. For example, a Gradient Boosting Machine may be used for Model Fitting 808 that includes the input of a weight vector, the weights originating from the credibility weights as shown in FIG. 19. Each observation that includes data associated with a brand may be weighted by that brand's credibility weight.

Credibility weights as described on FIG. 19 may be set in any number of ways. For example, they may be manually set and recorded into the database by a human who reviews the CV of each brands' video team on one or more professional networking websites. As another example, these weights may be set by a machine-process that mines the resume data of a brands' team and assigns a trustworthiness weight based on team members' resume attributes. Furthermore, such weights are not limited to being set using teams' CVs. They can be set using any information indicating the credibility of measured signals. For example, if one knows that a brand is not actively measuring and/or testing video, a low credibility weight may be set for insights derived from that brand's video spend.

Detecting Signals from Post-Spot Lift

In some embodiments of the invention, Effectiveness Measurement 110 comprises post-spot lift measurement, the post-spot lift representing Lift Caused By Ad 606 as shown in FIG. 6. Post-Spot Lift is an industry-known method used in linear TV measurement that involves quantifying spikes in web site traffic immediately following a television ad running on linear TV, then comparing this web site traffic spike to some baseline of expected traffic. The difference between the spike after the TV ad start time and the baseline is attributed to the television ad.

In some embodiments, the invention computes post-spot lift attributable to TV ads as described below. Post-spot lift measurements may then be mined in relation to video attributes to infer combinations of attributes most likely to cause post-spot lift and other performance gains.

a. Receive tv postlogs with minute- or second-level timestamps in UTC time b. Split each multi-feed airing into n records; one record per feed with timestamp of each adjusted to UTC time for the associated time zone c. Receive website visits in UTC time d. Optionally, to boost signal-to-noise ratio, remove traffic sources from web visit logs that are guaranteed not to show TV lift in the short-term e. Convert website visits logs to visit count per UTC time unit f. Join feed-adjusted postlogs with baselined website traffic, keyed on UTC time g. Compute baseline traffic per second per day using a statistical and/or machine learning technique that is not influenced by short-term perturbations in traffic caused by TV ads.

h. Compute lift per spot-time by subtracting baseline from actual visits per unit time, for example, as measured on a 5-min Window Following Ad 604*a* or 45-sec Window Following Ad 604*b*. DO NOT adjust and/or floor negatives to zero (a common error that invalidates the calculation).

i. Perform group by on a desired media attribute (i.e. network), aggregating spot-time lifts.

j. In this step, the invention stacks lift data for spots with similar attributes. Keep lift broken out by time.

k. Plot lift per unit time. As the number of airings increases, you should observe a bi-exponential curve if this is done correctly. More specifically, a steep rise in visits shortly after airing starts, then an exponential decay of incremental visits once the curve peaks (FAST RISE, SLOW FALL).

l. Divide by costs.

m. Use lift per cost (or cost per lift) to do relative comparisons across creatives, networks, dayparts, and other media buy options.

In some embodiments of the invention, post-spot lift baselines in (g) above is computed as follows:

a. Compute visits per second per day b. Join with postlog data, keyed on timestamp at second-level granularity.

c. "Black out" (set to NULL) any periods where airings occur. These are periods of time where the site traffic is most influenced by your TV ads. A 15-min blackout period per airing is used in some embodiments. Alternative embodiments use other blackout durations.

d. Apply a Smoothing Model 602*a*, such as a Kalman filter, to impute blackout gaps as well as smoothen the visits per second curve.

e. Alternative embodiments apply other Time Series, TSCS, and machine learning models for imputation and/or smoothing.

In some embodiments of the invention, post-spot lift baselines in (g) above is computed via an artificial intelligence model with output labels that include visits per second per day and input features that, in some embodiments, include visits from Same Time Yesterday 602*b*, Same Time Last Week or during a Prior State 602*c*, and Same Time Last Year 602*d*. Metric Baseline 602 may, in some embodiments, be computed using features from multiple modeling techniques (Model with Combination 602*f*), an example that includes visits from Same Time Yesterday 602*b* adjusted using a Smoothing Model 602*a*. This model is often common when lag features, like Same Time Yesterday 602*b* and Same Time Last Week 602*c*, cannot be directly used as input since they are impacted by video ads running during the lag period.

The disclosed post-spot lift baseline method is a substantial improvement over the industry status quo that uses the period prior to each linear TV ad to compute a baseline. Many media agencies use a "pre vs. post" baselining technique; that is, compare 5-minutes after a TV ad runs to 5-minutes before the ad ran, with the latter comprising the baseline. This baseline technique will be invalidated by overlapping spots since the earlier airing now influences (and increases) the baseline for the latter airing. This would cause the lift to be underestimated on the latter airing (and perhaps overestimated on the earlier airing depending on baselining details).

In some embodiments of the invention, post-spot lift is directly computed via time series model without the need for intermediate steps g, h, and i above.

Detecting Signals from Deindexed Search Query Trends Data

In some embodiments, Search Query Trends data are used to infer the performance of competitors and other video content. While Search Engine Trends data, in raw format, is rarely useful, disclosed is a method to deindex this data and convert it to absolute queries over time for any arbitrary keyword, including keywords associated with any arbitrary video content and/or sponsoring brand. Embodiments of the invention join this deindexed data to known ad airing timestamps, thus enabling Effectiveness Measurement 110 to Compute Metric Baseline 602, Measure Metric for Exposure 604, and Compute Lift Caused By Ad 606.

Search Engine Trends data is Received Data 600. If the Search Engine Trends data is indexed, embodiments of the invention can reindex and/or deindex this data. As shown in FIG. 15, the invention computes raw search queries via a deindexing process.

Search Engine Trends data, representing a value correlated with how many search engine queries are received for a keyword over a given period of time, are often obfuscated by search engines in a variety of ways. This obfuscation inhibits the ability for one to use this data to detect audio-visual performance signals. For example, query data may be indexed to a different scale, such as between 0 and 100. Further, search engines may restrict the window of time that data may be retrieved over depending on the time granularity of interest; if one desires to retrieve minute-level data, the response may be limited to a 24-hour window of time. Since each request is often indexed to a different scale based on the maximum and minimum query count values related to the specific request, the retrieved values for one day aren't comparable to the retrieved values for another.

As shown in FIG. 15, the invention applies a method to make this indexed data useful to detection of performance signals. Search Engine Trends data are deindexed by iteratively retrieving indexed search data for overlapping time windows of varying time unit granularity. This chronologically overlapping data of varying time unit granularity enables the indices of larger-magnitude time units to be partitioned across smaller-magnitude, child time granularities. Disclosed below are the steps used by the invention to make this data useful for performance signal detection in some embodiments of the invention:

a. Receive indexed search query count data 1502, 1504, and 1508 on the same keyword 1500 for overlapping time windows of varying time unit granularity. 1502 shows daily indexed data for a year. 1504 shows hourly indexed data for January 1 of the same year. 1508 shows minutely indexed data for 3 AM-4 AM on January 1 of the same year. For example, receive a daily index that includes 365 elements for a given year Y, receive hourly indexed values for each of the 365 daily index elements, and receive minutely indexed data for each of the 24 hours in each of the 365 days.

b. Roughly 9,126 individual API calls and/or retrieval steps may be needed to receive the data for a year, broken down as follows:
  i. 1 API call to receive daily index values across a year
  ii. 365 API calls to receive hourly indices for each day, a
  iii. 8,760 API calls (365 days×24 hours) to receive minutely indices for each hour of each day in the year.

c. Compute the percentage of total searches over year Y that occurred on day D, an example shown in 1502a. For example, to compute the percentage of year Y queries that occurred on January 1 of year Y, divide the daily index value of January 1 of Year Y by the sum of all 365 daily index elements for year Y.

d. Compute the percentage of total searches over day D that occurred in hour H as shown in 1506. For example, to compute the percentage of day D queries that occurred between 1 AM and 2 AM of day D, divide the hourly index value of 1 AM to 2 AM of day D of Year Y by the sum of all 24 hourly index elements for day D.

e. Compute the percentage of total searches over hour H that occurred in minute M, as shown in 1510. For example, to compute the percentage of hour H queries that occurred between minutes 1 and 2 of hour H of day D of Year Y, divide the minute index value of 1 to 2 of hour H by the sum of all 60 minutely index elements for Hour H.

f. Repeat steps similar to b, c, d, and e for any other time granularities needed. Examples of other time granularities include seconds, milliseconds, months, weeks, quarters, and decades.

g. Multiply out the percentages across nested time units to output the percentage of year Y queries that occurred in each minute M of year Y, as shown in 1512. For example, to compute the percentage of year Y queries that occurred during minute M, multiply the output of step (d) for minute M by the output of step (c) for hour H whose child is minute M by the output of step (b) for day D whose grandchild is minute M. At this point, any arbitrary minute in year Y is on the same scale and comparable.

h. Optionally, substitute in an absolute value of queries over any arbitrary overlapping window of time and/or time granularity to convert the result of step (g) to absolute queries per minute for any arbitrary time window. For example, as shown in 1514, if the invention receives that month j observed 100K queries for keyword 1500, these 100K queries may be divided by the summation of all minute-level percentages output by step (g) that are children of month j to output an estimate of absolute queries per 100 percentage points, said percentage points representing the percentage of queries for year Y to arrive in minute M. This mechanism enables calculation of estimated queries for each minute of year Y and any arbitrary time window in year Y.

The process of redistributing indices across time granularities as indicated in (g) may be repeated from the highest time granularity (i.e. year) to the lowest time granularity (i.e. second or millisecond), resulting in a lower-time granularity reindexing that is comparable across larger windows of time.

Using the above method, the invention can, for example, compute relative and/or absolute search queries for a given keyword on Jan. 10, 2022 at 10:30:21 AM that is now on the same scale and can be fairly, relatively compared with, for example, Dec. 20, 2023 at 9:45:01 PM.

By substituting in a single absolute value of search queries measured over any arbitrary time window that chronologically overlaps with the reindexed data of (g), the entirety of the reindexed data is converted into absolute queries by the invention. For example, if Jan. 10, 2022 at 10:30:21 AM was measured to have 10 absolute queries and the reindexing revealed that Dec. 20, 2023 at 9:45:01 PM had 2× as many queries as the former, the invention solves for the absolute number of search queries on Dec. 20, 2023 at 9:45:01 PM; this would equal 20 queries. As another example, if an absolute number of queries was Received 600 for the entire month of January 2022, since the reindexing allows for relative comparison between all granular time windows within January 2022, a simple arithmetic operation distributes the month-long absolute queries down to each second of January 2022, thus enabling the entirety of the reindexed search query data to be deindexed by the invention into absolute search queries over any arbitrary time window.

By joining the timestamps of known TV ad airings for a brand with the above absolute queries per time unit computed by the invention, post-spot lift on the search query trends data is achieved. For example, for each 5-minute window of deindexed and/or absolute search queries following each TV airing, an expected baseline of queries may be computed. Queries in excess of this baseline expectation, typically referred to as "lift", may be attributed to the airing. Pattern Recognition 114 is then performed to uncover the relationship between one or more mined attributes of the ads and the above computed lift, thus enabling the invention to score and output recommendations and/or predictions regarding video attributes likely to perform better than others.

Detecting Signals from Experimental Designs, Including Geographic Tests

Data from any experimental design, including randomized trials, may be used by Effectiveness Measurement 110 to Compute Lift Caused by Ad 606. As one example, in the case of a randomized trial, one randomly selected cohort of people may be exposed to one or more audiovisual stimuli while a separate cohort of people is not exposed to the one or more audiovisual stimuli. Data from this experimental design is Received Data 600. The data from the non-exposed cohort is used to Compute Metric Baseline 602. The data from the exposed cohort is used to Measure Metric for Exposure 604. The data from Metric for Exposure 604 and Metric Baseline 602 are compared to Compute Lift Caused by Ad 606, the result which may be Stored to DB 608.

One example of one Metric Baseline 602 is a count of non-exposed cohort participants who made a recent purchase from a given brand divided by total non-exposed cohort size. One example of one Metric for Exposure 604 is a count of users who made a recent purchase from a given brand divided by total exposure cohort size. To Compute Lift Caused by Ad 606, Metric for Exposure 604 may be divided by Metric Baseline 602, the ratio serving as a lift metric. This Lift Caused by Ad 606 ratio may then be Stored to DB 608 and used in other steps as shown in FIG. 1.

Data for geographic-based tests (geo-tests) are Received Data 600 for some embodiments of the invention. A typical test design to generate geo-test data is to have one set of viewers associated with one or more geographic regions candidates to be exposed to one or more audiovisual stimuli while viewers in a separate set of geographic regions are not. Designated Market Areas (DMAs) are a type of Geographic region. Zip code is a type of Geographic region. County and/or State are types of Geographic Regions.

In the case of a geo-tests, the data from the non-exposed geos may be pooled and used to Compute Metric Baseline 602. One example of Metric Baseline 602 is the number of web site purchases originating from users in the non-exposed geos over a period of time, all divided by an estimate of the number of people in those same geos. The data from the exposed geos may be pooled and is used to Measure Metric for Exposure 604. One example of Metric for Exposure 604 is the number of web site purchases originating from users in the exposed geos over a period of time, all divided by an estimate of the number of people in those same geos. The data from Metric for Exposure 604 and Metric Baseline 602 are compared to Compute Lift Caused by Ad 606 as previously described, the result which may be Stored to DB 608.

Detecting Signals from Causal Inference, Synthetic Controls, & Fuzzy Synthetic Controls As applied to TV advertising and other forms of video marketing, many experimental designs, especially as it relates to randomization of people to experimental cohorts, are either not possible, not economically feasible, or simply unethical. The invention provides numerous solutions to these dilemmas.

As an improvement over the status quo of experimental design measurement for video measurement, embodiments of the invention employ causal inference technique to construct synthetic control groups using retrospective data. Website pixel data, javascript data, website tracking data, and Automatic Content Recognition (ACR) data are all examples of potential retrospective data that the invention operates on and are Received Data 600. In some embodiments, the unit of observation is a representation of individual people. This can include such unique identifiers as a device identifier (i.e. mobile device, TV device, etc.), a website visit identifier, a session identifier, or any other identifier of users and/or people.

Some embodiments of the invention use the Python cem library to implement Coarsened Exact Matching as a means to construct the above described synthetic controls and to measure video treatment effects. Comparable archetypes are computed by the invention using known features about the observational units that are in Received Data 600. Examples of such features include historic video viewing patterns, demographic data, psychographic data, geographic data, website visit data, and all other information containing attributes of the observational units. Via the computation of archetypes, Coarsened Exact Matching enables "matched cohorts" to be formulated by the invention that are balanced along input features, with the sole difference between the cohorts being their participants' exposure to audiovisual stimuli of interest for signal measurement by the invention. The output cohort by the Coarsened Exact Matched that has not been exposed to the audiovisual stimuli of interest is called the synthetic control.

The synthetic control groups computed by the invention allow for fair, apples-to-apples comparison between at least two cohorts, one that may be exposed to at least one audiovisual stimulus while the other cohort is not. The latter cohort may be referred to as the "control group" or "holdout". Metrics differences observed between these two cohorts following video exposure are attributed to the video as Lift Caused By Ad 606.

Compute Metric Baseline 602 may be performed on synthetic controls. Measuring Metric For Exposure 604 may be performed on those exposed to the one or more audiovisual stimuli. As previously described, Metric for Exposure 604 may be compared with Metric Baseline 602, typically divided, to Compute Lift Caused By Ad 606.

One challenge with Coarsened Exact Matching is that in some cases, comparable exposed/unexposed matches are either not possible at the scale needed for solid statistical insights or not perfectly matched when Coarsened Exact Matching is applied, even after adjusting hyperparameters for the method. As an additional improvement, the invention may use one or more machine learning, artificial intelligence, and/or statistical algorithms to create fuzzy synthetic controls. Specifically, given an input of attributes representing one or more individuals either exposed or not exposed to one or more audiovisual stimuli, the model outputs values for Metric Baseline 602 that would have likely been observed if the observation was in an unexposed cohort.

In one embodiment of this method, Coarsened Exact Matching is used to "prime the pump" of a supervised XGBoost algorithm, with the synthetic control from well-matched Coarsened Exact Matching individuals being used as an input dataset to XGBoost. Features about the synthetic control observations are used on the inputs, such as a measure of how much TV the observation consumes, and a label is presented for each observation that represents the metric of measurement interest, such as whether a user purchased from a brand website. The fitted model is then scored on exposed individuals, with the output of said model representing Metric Baseline 602. Metric for Exposure 604 is measured on the same exposed individuals, with Metric for Exposure 604 and Metric Baseline 602 being compared and used to compute Lift Caused By Ad 606 as previously described.

In another embodiment for creating fuzzy synthetic controls, all data from Receive Data 600, not just unexposed individuals, may be used in the training of a Machine Learning algorithm, the output of said algorithm representing the metric of measurement interest. In this embodiment, at least one of the input features to the model is an indicator of the observations' exposure status to the audiovisual stimuli of interest. When scoring, toggling this indicator would yield either of Metric Baseline 602 or Metric for Exposure 604. As an example from one embodiment, setting this indicator to 0 would yield Metric Baseline 602 while setting this indicator to 1 would yield Metric for Exposure 604.

In some embodiments of Effectiveness Measurement 110, one or more machine learning models may be used to directly infer Lift Caused By Ad 606 without the need for Metric Baseline 602 or Metric for Exposure 604 being computed as intermediate steps. In one embodiment, an XGBoost algorithm is fit on Received Data 600, with one feature set to indicate the exposure status of the observation to the audiovisual of interest. Shapley Additive Explanations (SHAP values) are then computed on the XGBoost fit, with the SHAP value associated with the feature representing exposure status yielding the Lift Caused By Ad 606.

The above described XGBoost algorithm may be substituted with any artificial intelligence, machine learning, and/or statistical technique that achieves the same above-described purpose. Similarly, SHAP values may be substituted with any quantitative technique that achieves the same above-described purpose of interpreting Lift Caused By Ad 606.

Synthetic controls may be formulated by the invention using any data containing exposed and non-exposed users to one or more audiovisual stimuli of interest, including from geographic regions.

Detecting Signals from Automated Content Recognition (ACR) & Ad Detection Devices In some embodiments, Automatic Content Recognition (ACR) data is a type of Received Data 600 to Effectiveness Measurement 110. ACR is a technology embedded in many smart TVs that enables the TV to identify what is playing on the TV. The results of this recognition are typically sent back to the TV hardware vendor via the internet in near real-time. ACR data is used to identify individuals exposed and/or not exposed to one or more audiovisual stimuli of interest. ACR data may optionally be augmented by joining to other data, for example which include web logs for a brand website, census data, search query data, and pixel data.

In processing ACR data, embodiments of the invention apply causal inference techniques, including but not limited to the creation of synthetic controls and fuzzy synthetic controls, the result of which is used for Metric Baseline 602, Metric for Exposure 604, and Lift Caused By Ad 606.

In a particular noteworthy embodiment of the invention, data about viewers' broader TV viewing habits beyond those ads sponsored by a user of the invention, including which networks and times viewers consume audiovisual content, is especially useful as features for each of Coarsened Exact Matching and XGBoost fitting. For example, in order to measure Lift Caused By Ad 606 for a small TV advertiser, using measures of user TV consumption on ACR detections of ads for large, ubiquitous brands that run many TV ads is useful as input features to each of Coarsened Exact Matching and XGBoost since this enables more granular controlling for the extent and timing of TV consumption and the interests of individual viewers. Without this broader, extra-brand ACR data unrelated to a brand user of the invention, it's been commonly observed that the synthetic controls are biased. More specifically, the synthetic control groups tend to bias towards users who consume less TV unless this extra-brand data is used as an input into the invention alongside other ACR data.

Alternative embodiments of the invention may use ACR-like data whose detections originate from one or more devices that do not include a smart TV. As one example, detections made by a smartphone, a mobile device, an acoustic monitoring system, a household appliance, and/or any other instrument that detects audio and/or visual features of played audiovisual content may be used, the output of which is Received Data 600. This data is then processed by the invention in a similar fashion as described for ACR data. Lift Caused By Ad 606 is computed and Stored to DB 608 as shown in FIG. 6.

Detecting Signals from Electronically-Monitored Panels, Including Set-Top Box Data Some embodiments of the invention may use panels in place of or in addition to ACR data, panels including one or more users enrolled by a third party to have their TV viewing habits monitored. Monitoring may be achieved via a set-top box, an acoustic detection device, or any other method that enables an ad exposure to be detected. This data is Received Data 600 and is processed by the invention in a similar fashion as described for ACR data. Lift Caused By Ad 606 is computed and Stored to DB 608 as shown in FIG. 6.

Detecting Signals from Time Series Models, Time Series Cross Sectional Models (TSCS), & Bayesian Structural Time-Series Models Some embodiments of the invention use time series (TS), cross sectional (CS), times series cross sectional (TSCS), and/or Bayesian structural time-series methods to infer Lift Caused By Ad 606.

In the case of a time series model, data representative of people exposed and not exposed to one or more audiovisual stimuli, especially website traffic, may be Received Data 600. Metric Baseline 602 can be any metric of interest at one or more points in time before one or more audiovisual stimuli is exposed to one or more people. One example of a metric of interest may be the percentage of web site visitors who make a purchase. Metric for Exposure 604 can be any metric of interest at one or more points in time after one or more audiovisual stimuli is exposed to one or more people. As previously described, Metric for Exposure 604 may be compared with Metric Baseline 602, typically divided, to Compute Lift Caused By Ad 606. Lift Caused By Ad 606 may be Stored to DB 608 as shown in FIG. 6.

In the case of a time series cross sectional model, data representative of people exposed and not exposed to one or more audiovisual stimuli, especially website traffic, may be Received Data 600. The received data may be grouped into cohorts of observations that correspond to the likelihood of audiovisual stimuli impacting one or more cohorts, with the less likely impacted serving as a control group. For example, in one embodiment of the intention, a TSCS model is applied to geo-test data, whereby cohorts represent geos that were exposed or not exposed to one or more audiovisual stimuli. In an alternative embodiment, search query trends for a brand that competes with a user of the invention is used as one group while search query trends for the brand user of the invention is the other group. In another alternative embodiment, web traffic from a subset of a web site more insulated from audiovisual stimuli is used as one cohort while data from a subset of a web site likely influenced by audiovisual stimuli is another cohort. In another alternative embodiment, web traffic from a subsidiary company and/or subdomain more insulated from audiovisual stimuli is used as one cohort while web site traffic data from a user of the invention is another cohort.

To compute Metric Baseline 602 in a TSCS structure, one or more metrics of interest are assessed for change over time after initiation of audiovisual exposure as compared with before audiovisual exposure on the cohort more insulated from the audiovisual exposure. One example of a metric of interest may be the percentage of web site visitors who make a purchase. A similar calculation is performed on the cohort likely impacted by one or more audiovisual stimuli, yielding Metric for Exposure 604. As previously described, Metric for Exposure 604 may be compared with Metric Baseline 602, typically divided, to Compute Lift Caused By Ad 606. Lift Caused By Ad 606 may be Stored to DB 608 as shown in FIG. 6.

Metric Baseline 602 and/or Metric for Exposure 604 need not be explicitly computed as intermediate steps; some embodiments of the invention use a TSCS model design that directly infers Lift Caused by Ad 606.

A Bayesian structural time-series model is used in some embodiments of the invention to Compute Lift Caused By Ad 606 as shown in FIG. 6. In these embodiments, the processing of Received Data 600 is similar to that described as embodiments that use a TSCS structure. The received data may be grouped into cohorts of observations that correspond to the likelihood of audiovisual stimuli impacting one or more cohorts, with the less likely impacted serving as a control group. For example, in one embodiment of the intention, a Bayesian structural time-series model is applied to geo-test data, whereby cohorts represent geos that were exposed or not exposed to one or more audiovisual stimuli. In an alternative embodiment, search query trends for a brand that competes with a user of the invention is used as one group while search query trends for the brand user of the invention is the other group. In another alternative embodiment, web traffic from a subset of a web site more insulated from audiovisual stimuli is used as one cohort while data from a subset of a web site likely influenced by audiovisual stimuli is another cohort. In another alternative embodiment, web traffic from a subsidiary company and/or subdomain more insulated from audiovisual stimuli is used as one cohort while web site traffic data from a user of the invention is another cohort.

In this embodiment, the Bayesian structural time-series is applied to the above data to compute a counterfactual for the exposed (more likely influenced) cohort. The counterfactual represents how the metric of interest would have changed over time had the one or more audiovisual stimuli not been applied. This counterfactual and/or an aggregation of this counterfactual is the Metric Baseline 602 while the directly measured changes over time of the exposed cohort after the point in time of the exposure is the Metric for Exposure 604. As previously described, Metric for Exposure 604 may be compared with Metric Baseline 602, typically divided, to Compute Lift Caused By Ad 606. Lift Caused By Ad 606 may be Stored to DB 608 as shown in FIG. 6.

Detecting Signals from Surveying, Research Panels & Self-Reporting Methods

Survey data, whether via online or offline survey, is another type of data that may be Received Data 600 for Effectiveness Measurement 110 in some embodiments of the invention, as shown in FIG. 6. Any number of survey tools, including those provided by online search engines, instrumented into a brand's website, and/or collected via one or more research panels, may be used to collect data from people who have or haven't been exposed to one or more video stimuli of measurement interest. Screening questions may be applied to determine whether a surveyed person has seen the video stimulus.

Data collected from people determined not exposed to the audiovisual stimulus are a Survey of Non-Exposed People 602e as shown in FIG. 6. Data collected from people determined to have been exposed to the audiovisual stimulus are a Survey of Exposed People 604c. The Survey of Non-Exposed People 602e may be used to Compute Metric Baseline 602 while the Survey of Exposed People 604c may be used to Measure Metric For Exposure 604. As one example of one Metric Baseline 602, a count of survey respondents who answered that they made a recent purchase from a given brand divided by total survey respondents, where those respondents have been determined not to have been exposed to a video stimulus, may be used. As one example of one Metric for Exposure 604, a count of users who answered that they made a recent purchase from a given brand divided by total survey respondents, where those respondents have been determined to have been exposed to a video stimulus, may be used. To Compute Lift Caused by Ad 606, Metric for Exposure 604 may be divided by Metric Baseline 602, the ratio serving as a lift metric. This Lift Caused by Ad 606 ratio may then be Stored to DB 608 and used in other steps as shown in FIG. 1.

Figure 9:
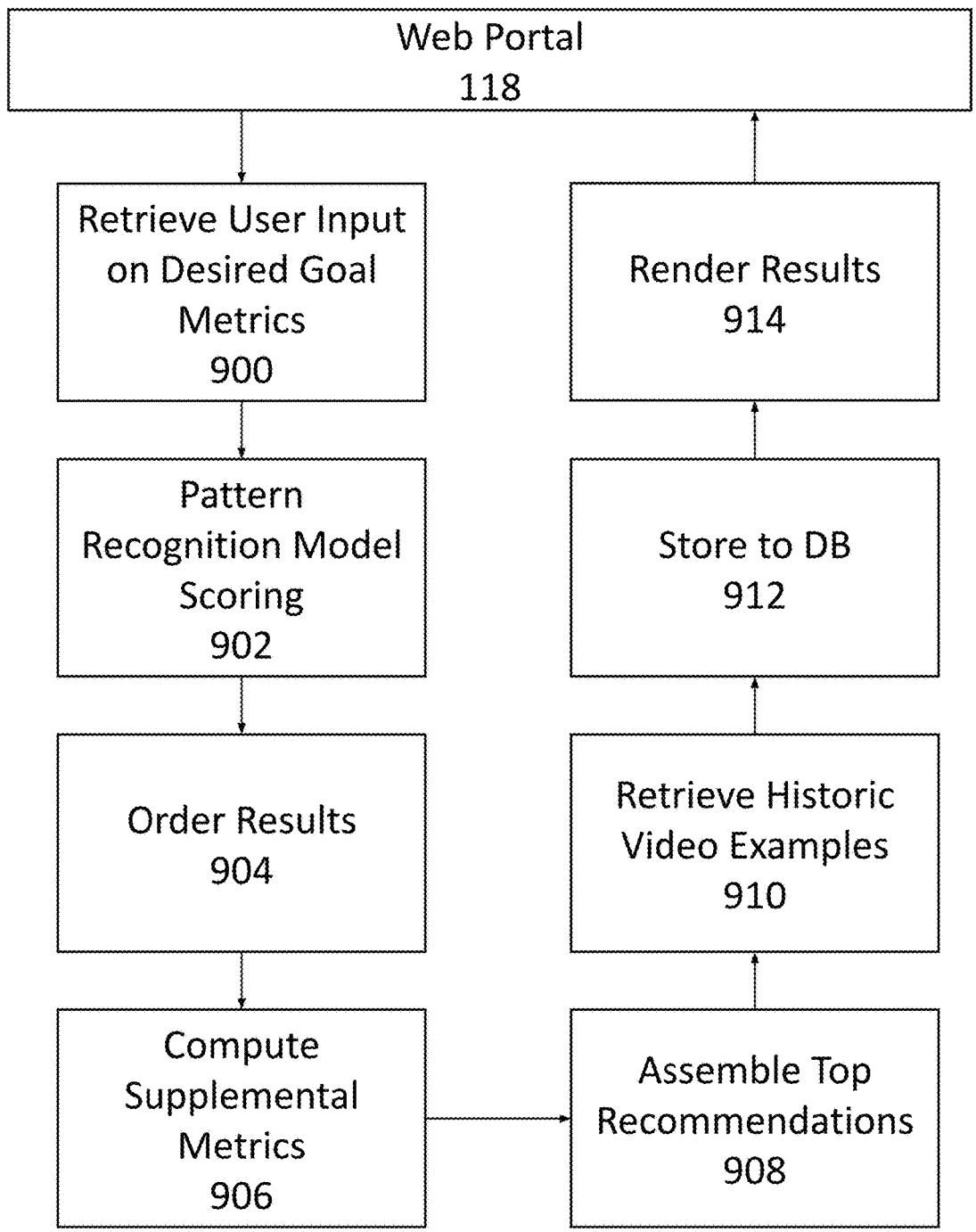
FIG. 9 depicts an expanded view of Output Generation 116 shown in FIG. 1 and how information is received from and provided to a human user according to various embodiments of the present invention.

Output Generation 116 Further Described in FIG. 9

In some embodiments of the invention according to FIG. 9, Web Portal 118 is used to both receive and convey information to a human user. The first step of Output Generation 116 in some embodiments of the invention is to Retrieve User Input on Desired Goal Metrics 900. In some embodiments of the invention, this information is retrieved from an end user via Web Portal 118. An example of a visual user interface to Retrieve User Input on Desired Goal Metrics 900 via Web Portal 118 is depicted in FIG. 10. As illustrated in FIG. 10, Web Portal 118 input view, dropdown menus that enable a user to select one or more target metrics, including target audiences, channels, and measurement window, are shown. In some embodiments of the invention, Pattern Recognition Model Scoring 902 may use input from an end user, originating from Web Portal 118, in conjunction with Pattern Recognition 114 to render scores. An example of the output from Scoring 902 is a list of video topics along with predicted probabilities of success for achieving the user-specified goal(s).

Figure 12:
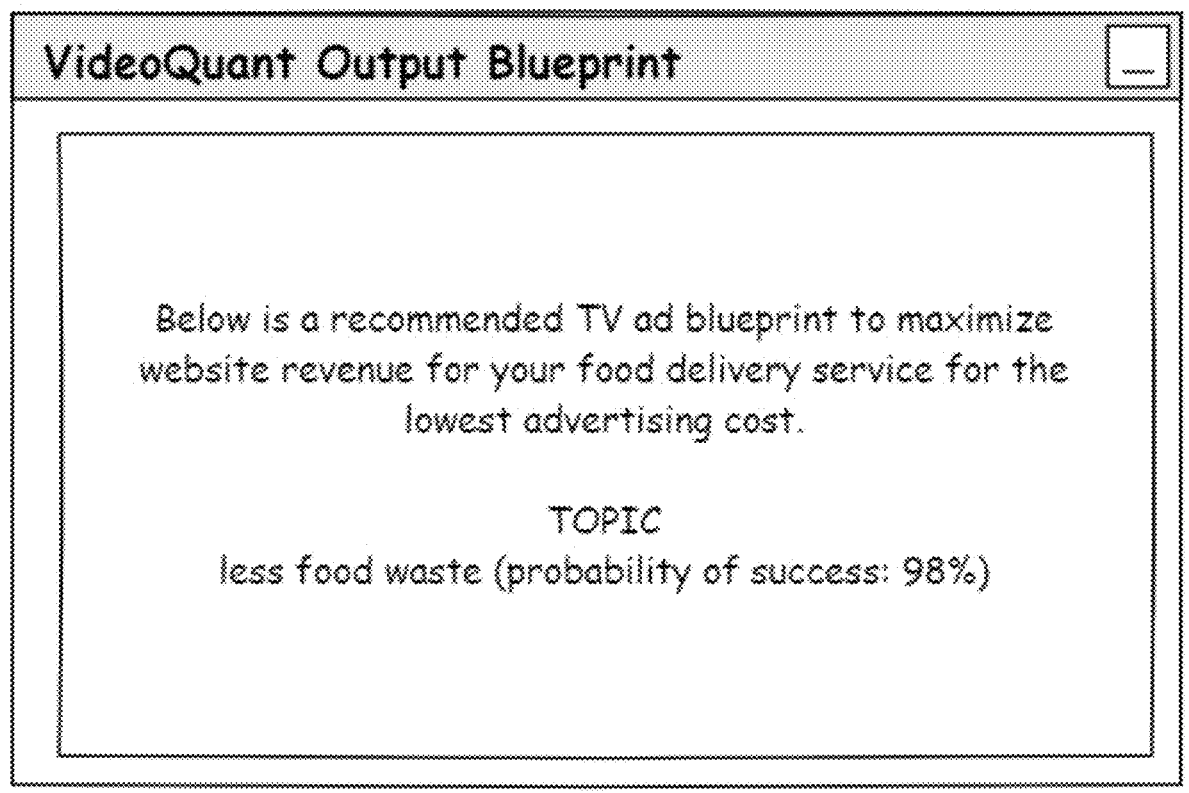
FIG. 12 depicts another visual display of output provided to a human user through Web Portal 118 according to various embodiments of the present invention.

In some embodiments of the invention, results from Scoring 902 may be sorted by Order Results 904. For example, results may be ordered from highest to lowest score, with the score representing the predicted probability of success on the user-specified goal(s). In some embodiments of the invention, results from Scoring 902 and/or Order Results 904 may be supplemented with additional metrics via Compute Supplemental Metrics 906. As one example, the numerical rank of each topic's predicted probability of success may be appended to the result from Scoring 902 and/or Order Results 904. As another example, the differences in estimated revenues predicted for each topic may be computed and rendered alongside any results from Scoring 902 and/or Order Results 904. In some embodiments of the invention, a subset of scored results may be extracted via Assemble Top Recommendations 908. As one example, this may be performed using a LIMIT clause of SQL. In some embodiments of the invention, results are augmented with historic examples of video that is similar to the recommendation(s) via Retrieve Historic Video Examples 910. For example, if one of the results from Assemble Top Recommendations 908 is to produce a video on the topic "pizza", one or more historic videos and/or snippets of prior videos about the topic pizza may be rendered in the output. Results from any and all components of Output Generation 116 may be stored to Data Storage 104 via Store to DB 912. Results from Output Generation 116 may be assembled for presentation to an end user via Render Results 914. Render Results 914 may present results via Web Portal 118. Examples of results rendered in some embodiments of the invention via Web Portal 118 are shown in FIG. 11, FIG. 12, and FIG. 13.

FIG. 11 shows an example of results rendered by Web Portal 118. For this example, an end user entered via Web Portal 118 a target goal of maximizing search lift on female audiences.

In some embodiments of the invention, the target goal of maximizing search lift on female audiences is input on a screen, an example of the screen shown in FIG. 10. Through the described functioning on Data Retrieval 106, Attribute Recognition 108, Effectiveness Measurement 110, Time Normalization 112, and Pattern Recognition 114, in conjunction with Memory 102, Data Storage 104, and Processor 100, Output Generation 116 outputs to Web Portal 118 that a single actor with a French accent is likely to achieve the target goal.

In FIG. 11, recommended actor count displayed via Web Portal 118 is particularly supported by the functioning of Visual Data Processor 202 and/or Audio Data Processor 204. Visual Data Processor 202 would ascertain actor counts via computer vision achieved using Viola-Jones Detection 306 in Visual Classification 308; objects would be actors in this case. Together with or alternatively, Audio Data Processor 204 uses Audio Classification 416 to determine actor counts based on computer audition of distinct voices. This input, along with that provided by Effectiveness Measurement 110 and/or Time Normalization 112, would be used to model cause-and-effect via Pattern Recognition 114, the resulting model together with received user input 900 and Output Generation 116 used to render the recommended actor count shown on FIG. 11. The recommendation of using a French accent would particularly be supported by Audio Data Processor 204. More specifically, the example Speaker Accents 416c module of Audio Classification 416 ascertains speech accents used within audiovisual data.

FIG. 12 depicts an alternative output view for Web Portal 118. The output displayed in FIG. 12 shows the topmost recommended topic for a video aimed at maximizing website revenue at the lowest advertising cost for a client's food delivery service. Embodiments of the invention output that the topic of "less food waste" is most likely to achieve the target goal. A probability of success score is displayed alongside one or more recommendations as depicted in FIG. 12. This probability metric is calculated by Compute Supplemental Metrics 906. FIG. 13 depicts an alternative output view for Web Portal 118. In some embodiments of the invention, output by Output Generation 116 includes video topic, actor counts and descriptions, plot lines, voiceover messaging, recommended media (including TV stations, media channels, and time slots) and/or ad duration.

Example Usage of the Invention to Gain Competitive Advantage in Various Markets

As one example of how embodiments of the invention can be used to gain a significant business competitive advantage, given:
 a. a small retail startup business desires to use TV advertising to build brand recognition.
 b. the startup has no prior TV advertising experience.
 c. a large competitor to the startup exists that spends $1 Billion per year on TV advertising.

The configuration of Processor 100, Memory 102, and Data Storage 104 enables Data Retrieval 106 to gather audiovisual data from the billions of dollars spent by the competitor. The audiovisual data may be gathered from the public domain and/or any third-party.

Attribute Recognition 108 extracts and/or computes additional data attributes from the audiovisual data. Effectiveness Measurement 110 computes the market impact of the audiovisual content. Time Normalization 112 controls for the varying release and/or publication dates of each competitor ad comprising the audiovisual data. Pattern Recognition 114 identifies one or more relationships between attributes output by Audiovisual Processing 118 and results quantified by Effectiveness Measurement 110. Any, both, or none of the output from Audiovisual Processing 118 and Effectiveness Measurement 110 may be transformed by Time Normalization 112. Output Generation 116, supported by the operation of Processor 100, Memory 102, Data Storage 104, and user input of one or more goals into Web Portal 118, renders optimized recommendations for video ads based on insights gained from the billions of dollars spent by the competitor. Examples of the output rendered by embodiments of the invention are depicted in FIGS. 11, 12, and 13. The results may be displayed via Web Portal 118.

Post-Production Embodiments

Embodiments of the invention may be used to score pre-existing videos supplied by one or more users of the invention. Examples of pre-existing video may include but not be limited to a set of new candidate video ads being considered for TV and/or online advertising, draft videos, and/or storyboards. In FIG. 1, Data Retrieval 106 retrieves one or more candidate videos via upload to Web Portal 118 or from another source as described herein. Through the described operation of Attribute Recognition 108 and Pattern Recognition 114, a score is produced by Output Generation 116 and displayed via Web Portal 118.

Among other uses, the results may be used to compare videos and/or decide which videos to run in-market. Similarly, the results may be used to decide how much media spend to invest behind each analyzed video.

Determining Competitor Video Channels, Videos, And/or Creating a Subset of Videos to Analyze Some embodiments of the invention determine a subset of videos to process by using Pattern Recognition 114 to compute videos and/or channels "most similar to" one or more sample videos and/or channels. In some embodiments of the invention, Processor 100, Memory 102, and Data Storage 104 are configured to enable Data Retrieval 106 to gather only metadata for videos that appear in public and/or private domains. In some embodiments, the gathered metadata may include video title. A user may input one or more sample videos into Web Portal 118, the sample videos representing examples of the types of videos they would like to optimize on one or more target goals. As an example, the sample videos may be videos specific to the user's industry and/or brand. Attribute Recognition 108 uses Metadata Processor 206 to compute attributes from the gathered metadata and/or one or more user-input sample videos. The operation of Metadata Processor 206 may include converting the case of gathered text metadata, tokenization, stop word removal, punctuation removal, lemmatization, and/or computing one or more term-document matrices and/or term frequency—inverse document frequencies.

Pattern Recognition 114 computes similarities between one or more sample video attributes and gathered metadata for videos that appear in public and/or private domains. The computation of similarity may include, for example, computing cosine similarity, Jaccard, Doc2vec, Word2vec, Universal Sentence Encoder, BERT, and/or computing one or more similarity matrices. The similarity computation is used to identify one or more most similar metadata entries to the one or more sample videos. In some embodiments, the top 50 most similar entries to the sample are computed by Pattern Recognition 114. One or more identifiers of the computed most similar entries are supplied to Data Retrieval 106. Data Retrieval 106 uses the similarity identifiers to gather additional data about the similar entries. The additional data may include, for example, audiovisual data associated with the identifiers and/or audiovisual content associated with the channel to which the identifiers are associated.

The data gathered by Data Retrieval 106 for this subset of video content is then processed in accordance with the operations described herein. In practice, the described capability of identifying most similar videos is useful to identifying competitor digital video channels and/or video content to analyze. In some embodiments of the invention, Web Portal 118 accepts user input about one or more subsets of videos to analyze. For example, a user may input the names of one or more brands, videos, and/or channels; the operation of Data Retrieval 106 may then be restricted to gathering data from these user-specified sources. Optionally, the similarity computation described herein may be used to augment and/or expand one or more subsets of brands, videos, and/or channels on which Data Retrieval 106 will operate.

Other Notable Alternative Embodiments

In standard practice, all elements are necessary. However, a simplified embodiment of the invention may be built that uses only a subset of Attribute Recognition 108, a subset of Effectiveness Measurement 110, and a simplified Pattern Recognition 114 according to FIG. 1. As one example of an alternative embodiment, just video titles may be analyzed. The output from this simplified embodiment would look like that depicted in FIG. 12. Visual Data Processor 202 and Audio Data Processor 204 are not needed to achieve this capability; only Metadata Processor 206 within Audiovisual Processing 108 is used. Pattern Recognition 114 can be swapped out for a statistical model or even just basic averaging.

In alternative embodiments, a database, a computer screen, a printed document, or any other method to convey results may be used in place of Web Portal 118. Embodiments of the invention can improve processing time by distributing workload across multiple computers and/or virtual machines. In this embodiment, Processor 100 and Memory 102 may reside on multiple machines (virtual and/or physical). Data Storage 104 may be cloned and/or sharded across multiple machines. In numerous embodiments of the invention, results from Output Generation 116 may include novel audiovisual content and/or storyboards. For example, if the recommended video topic is a car being driven, output from embodiments of the invention may be a video clip of a car being driven and/or one or more graphical representations of a car driving. This output may be generated by stitching together pieces of historic videos and/or "reversing" computer vision to express rather than recognize concepts.

In numerous embodiments of the invention, results from Output Generation 116 may convey guidance around multiple scenes and/or segments recommended for a new video. For example, for the end user to achieve the best results on a future video, the first 10 seconds might require 1 actor while the next 10 seconds might require 2 actors of differing genders. Time Normalization 112 may occur in a number of orders. In some embodiments, Time Normalization 112 acts on the output from either or both Attribute Recognition 108 and/or Effectiveness Measurement 110. However, alternative embodiments can have Time Normalization 112 occur before or embedded within Attribute Recognition 108 and/or Effectiveness Measurement 110. Other embodiments can have Time Normalization 112 occur within Pattern Recognition 114 or not at all.

In alternative embodiments of the invention, Output Generation 116 pre-computes results before receiving user input and stores these results to Data Store 104. This would enable faster retrieval of results via a database query rather than Scoring 902. For example, the best video topic for both male and female audiences may be pre-computed using Scoring 902. When an end-user inputs a target goal of maximizing web traffic for female audiences, the pre-computed blueprint for female audiences may be retrieved from Data Store 104 rather than needing to run Scoring 902.

In the field of military defense, embodiments of the invention may be used for war games. User Input 900 may be a desired military objective. By gathering satellite and/or other audiovisual imagery and historic data via Data Retrieval 106, all other components of the invention will operate as described to yield an optimized blueprint for achieving the input objective. As one example, the blueprint produced by Output Generation 116 may include such information as optimized positioning of fleets, troops, or special ops forces. In the medical field, embodiments of the invention may be applied to CT and other radiology scans to assess how those scans impact long-term health outcomes and how those long-term health outcomes may be optimized.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

INDUSTRIAL APPLICATION

The present invention applies to the television and digital video performance optimization sector. It introduces a system that, without requiring investment in video development and testing, predicts video concepts and attributes likely to succeed at achieving a plurality of performance objectives.

The business impact derived from operation of the invention by a user are:
a. the user's video content, including TV ads, is expected to perform significantly better than ads developed through the status quo, including but not limited to ads developed via trial and error, test-and-learn, AB split testing, and multi-armed bandit approaches.
b. unlike the status quo, users of the invention would incur no upfront video development, media, and/or testing cost before insights are achieved. In contrast, the status quo front-loads video costs before insights are achieved.
c. through the operation of the invention, the user directly benefits from each dollar that a competitor spends on video.
d. while further use of the invention will be required to validate cost savings, the invention has been observed to reduce video ad failure rate by over 40 percentage points vs. the status quo in testing. Extrapolating these early pilot test results suggests that, across a handful of large video advertisers, the invention may collectively achieve a cost savings of over $1 billion per year. Further real-world use will be needed to validate this figure.

As made clear from the above example, embodiments of the invention yield an inverse relationship between competitor ad spend and the ad failure rate for users of the invention. The more a competitor spends on video ads, the greater the advantage to users of the invention.

What is claimed is:

1. A method of transmitting a video between two network nodes on a packet-switched network, the method comprising:
a. at a first network node, receiving or sending a video feed via said packet-switched network and determining, for each video in said video feed, via artificial intelligence, by way of parsing the video feed and extracting elements there-within, wherein at least three of the following:
  i. extracting an audio feed associated with the video feed and determining a manner of speech used by human figures within each said video further comprising associating audio with each human figure of said human figures in step ii.;
  ii. extracting from said video feed quantity of human figures within each said video based on image recognition of said human figures extending through multiple frames of said video feed;
  iii. determining a quality of a face of a human figure within each said video;
  iv. determining a quality of an object in contact with a human figure within each said video;
  v. extracting an audio feed associated with said video feed and determining a mood of music associated within each said video;
  vi. extracting an audio feed associated with said video feed and determining a theme of each said video;
  vii. extracting an audio feed associated with said video feed and determining a plot of each said video based on a comparison of previous plots with dialog extracted using speech to text recognition of said audio feed;
  viii. determining movement of objects within each said video;
  ix. extracting for the video feed alphanumeric characters displayed within each said video;
b. at a second network node, receiving or sending videos to an end-user video display device located at a third network node;
c. determining effectiveness of each said video based on one of increased revenue and increased data received by third parties as a result of said parsing of said video, by subtracting or multiplying with a baseline expectation of at least one of said increased revenue and said increased data received by third parties in relation to time since airing and/or publication of said each video in said video feed;
d. based on said determined effectiveness across a plurality of videos in said video feed, outputting a recommendation of markers to be injected into in a new video based on said determined effectiveness.

2. The method of claim 1, wherein at least a portion of said determined effectiveness is attributed, via artificial intelligence, to at least a portion of one said video marker.

3. The method of claim 1, wherein a further video marker used within said step of determining effectiveness is a sponsor of each said video, wherein said determining effectiveness based on said sponsor of each video includes a determination of differences between each said video by said sponsor and effectiveness thereof each said video by said sponsor.

4. The method of claim 1, wherein a further video marker used within said step of determining effectiveness of a particular video of one of said each video of said video feed is a length of time and/or number of times over which said video is shown on said end-user video displays.

5. The method of claim 1, wherein said determining effectiveness is made using causal inference.

6. The method of claim 1, wherein a further video marker used within said step of determining effectiveness of said each video is search query trends data for at least one keyword associated with at least one attribute of said each video, wherein search query trends data is compared over time in relation to the airing and/or publication date of said each video.

7. The method of claim 1, wherein at said first network node, receiving or sending further videos and using heuristic matching of each further video of said further videos with said each video in said video feed to determine potential effectiveness of each further video.

8. The method of claim 1, wherein based on said determined effectiveness, sending videos to additional end-user video displays at a rate commensurate with at least one of expected increased revenue and expected increased data received by third parties as a result of said sending videos to said additional end-user video displays.

9. The method of claim 1, wherein of said at least three video markers is a quality of face of at least one of an animal, human, and non-human character, said quality of face determined by a facial recognition engine examining individual frames of said each video in said video feed.

10. The method of claim 1, wherein of said at least three video markers is a quality of motion, said quality of motion determined by comparison of pixel attributes across a plurality of frames of said each video in said video feed.

11. The method of claim 1, wherein of said at least three video markers are elements of sound for at least a portion of audio comprising at least a portion of said video; wherein attributes of said audio are determined based on heuristic comparison of said audio to previously recorded audio with known attributes.

12. The method of claim 1, wherein a further video marker used within said step of determining effectiveness is at least one of theme, plot, and keywords of at least some of each said video, said theme, plot, and keywords determined by natural language processing (NLP) of text associated with said each video in said video feed.

13. The method of claim 1, wherein a further video marker used within said step of determining effectiveness is a machine-readable label in at least some of each said video.

14. The method of claim 1, wherein a further video marker used within said step of determining effectiveness is a manner of speech in at least of said of each said video.

15. The method of claim 1, wherein a further video marker used within said step of determining effectiveness is a quality of an object in contact with at least one of a human or non-human character in at least some of said each video.

16. The method of claim 15, wherein said object comprises clothing.

17. The method of claim 5, wherein said determining effectiveness using causal inference comprises employing at least one of the creation of synthetic controls and fuzzy synthetic controls to construct synthetic control groups using retrospective data.

* * * * *